(12) United States Patent
Hyeon et al.

(10) Patent No.: US 7,811,545 B2
(45) Date of Patent: Oct. 12, 2010

(54) PROCESS FOR LARGE-SCALE PRODUCTION OF MONODISPERSE NANOPARTICLES

(75) Inventors: Taeg-Hwan Hyeon, Seoul (KR); Jong-Nam Park, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 399 days.

(21) Appl. No.: 11/285,381

(22) Filed: Nov. 23, 2005

(65) Prior Publication Data

US 2006/0133990 A1   Jun. 22, 2006

(30) Foreign Application Priority Data

Nov. 26, 2004   (WO) .............. PCT/KR2004/003090

(51) Int. Cl.

| | |
|---|---|
| *C01G 9/02* | (2006.01) |
| *C01G 45/02* | (2006.01) |
| *C01G 49/02* | (2006.01) |
| *C01G 51/04* | (2006.01) |
| *C01F 17/00* | (2006.01) |
| *C01B 13/14* | (2006.01) |

(52) U.S. Cl. ................. 423/592.1; 423/263; 423/593.1; 423/594.1; 423/594.5; 423/594.14; 423/599; 423/622; 423/632; 428/546

(58) Field of Classification Search ... 423/594.1–594.5, 423/595, 598–599, 604–616, 622, 625, 594.17, 423/632–633, 263, 596, 597; 428/546
See application file for complete search history.

(56) References Cited

U.S. PATENT DOCUMENTS 5,770,172 A * 6/1998 Linehan et al. .......... 423/561.1
6,200,680 B1 * 3/2001 Takeda et al. ............... 428/402

OTHER PUBLICATIONS

Jana, N. R. et al., "Size- and Shape-Controlled Magnetic (Cr, Mn, Fe, Co, Ni) Oxide Nanocrystals via a Simple and General Approach" *Chem. Mater*, vol. 16, pp. 3931-3935, (Sep. 11, 2004).
Yu, W.W. et al., "Synthesis of monodisperse iron oxide nanocrystals by thermal decomposition of iron carboxylate salts" *ChemComm*, pp. 2306-2308, (Sep. 2, 2004).
Hyeon, T. et al., "Synthesis of Highly Crystalline and Monodisperse Magghemite Nanocrystallites without a Size-Selection Process" *J. Am. Chem. Soc.*, vol. 123, No. 51, pp. 12798-12801, (2001).
Stoeva, S. et al., "Gram-Scale Synthesis of Monodisperse Gold Colloids by the Solvated Metal Atom Dispersion Method and Digestive Ripening and Their Organization into Two-and Three-Dimensional Structures" *J. Am Chem. Soc.*, vol. 124, No. 10, pp. 2305-2311 (Feb. 14, 2002).
Sun, S. et al., "Size-Controlled Synthesis of Magnetite Nanoparticles", *J. Am. Chem. Soc.*, vol. 124, pp. 8204-8205, (Jun. 20, 2002).
Sun, S. et al., "Monodisperse $Mfe_2O_4$ (M=Fe, Co, Mn) Nanoparticles" *J. Am. Chem. Soc.*, vol. 126, pp. 273-279, (Dec. 10, 2003).
Puntes, Victor F., "Colloidal Nanocrystal Shape and Size Control: The Case of Cobalt" *Science*, vol. 291, pp. 2115-2117, (Mar. 16, 2001).

* cited by examiner

*Primary Examiner*—Stanley Silverman
*Assistant Examiner*—James A Fiorito
(74) *Attorney, Agent, or Firm*—The Nath Law Group

(57) ABSTRACT

The present invention is directed to a process for making nanoparticles of metals, metal alloys, metal oxides and multimetallic oxides, which comprises the steps of reacting a metal salt dissolved in water with an alkali metal salt of $C_{4-25}$ carboxylic acid dissolved in a first solvent selected from the group consisting of $C_{5-10}$ aliphatic hydrocarbon and $C_{6-10}$ aromatic hydrocarbon to form a metal carboxylate complex; and heating the metal carboxylate complex dissolved in a second solvent selected from the group consisting of $C_{6-25}$ aromatic, $C_{6-25}$ ether, $C_{6-25}$ aliphatic hydrocarbon and $C_{6-25}$ amine to produce the nanoparticles.

12 Claims, 20 Drawing Sheets

PROCESS FOR LARGE-SCALE PRODUCTION OF MONODISPERSE NANOPARTICLES

This application claims conventional priority to Korean PCT Application Number PCT/KR2004/003090 filed on Nov. 26, 2004, the contents of which are hereby incorporated by reference in their entirety.

TECHNICAL FIELD

The present invention relates to a process for large-scale production of monodisperse nanoparticles. More particularly, the present invention is directed to a process for making nanoparticles of metals, metal alloys, metal oxides and multimetallic oxides, which comprises the steps of reacting a metal salt dissolved in water with an alkali metal salt of $C_{4-25}$ carboxylic acid dissolved in a first solvent selected from the group consisting of $C_{5-10}$ aliphatic hydrocarbon and $C_{6-10}$ aromatic hydrocarbon to form a metal carboxylate complex; and heating the metal carboxylate complex dissolved in a solvent selected from $C_{6-25}$ aromatic, $C_{6-25}$ ether, $C_{6-25}$ aliphatic hydrocarbon or $C_{6-25}$ amine to produce the nanoparticles.

BACKGROUND ART

The developments of various nanoparticles, also called nanocrystals, have been actively tried since they may be materials for a new emerging area known as nanotechnology in such applications areas as ultra-high density magnetic data storage media, biomedical labeling reagents, nanoscale electronics, the source materials for very highly efficient laser beams and very bright optical devices.

For such a wide range of applications, the method of synthesizing monodisperse nanoparticles with a size variation of less than 5% is a very important key factor in controlling the basic characteristics of the base materials, because the properties of these nanoparticles are strongly dependent upon the dimension of the nanoparticles.

For example, the determining factor for the color sharpness of the nanocrystal-based optical devices in a semiconductor is primarily the uniformity in the size of the nanoparticles, where such monodisperse magnetic nanoparticles are critical base material for the application to the ultra-high density magnetic storage media.

Since such monodisperse nanoparticles can be used for a wide range of applications as described above, it is highly desirable to develop a process for producing the base nanoparticle material in large quantity.

Unfortunately, the synthesis process for monodisperse nanoparticles which have been known until now, are limited to the sub-gram level of quantities.

Murray et al. disclosed in U.S. Pat. No. 6,262,129 B1 a method of synthesizing nanoparticles of transition metals from the reaction of metal precursors at high temperature, in which method the size selection procedure for achieving a size uniformity required certainly for controlling the desired characteristics, is a high cost and difficult process for mass producing the monodisperse nanoparticles, whereby the large scale production of the base material is hampered in this method.

Monodisperse gold nanoparticles have been synthesized by the digestive ripening of the initially polydisperse nanoparticles[Stoeva, S. et al., "Gram-Scale Synthesis of Monodisperse Gold Colloids by the Solvated Metal Atom Dispersion Method and Digestive Ripening and Their Organization into Two- and Three-Dimensional Structures", J. Am. Chem. Soc. 2002, 124, 2305].

However, long aging time as well as the difficulty in size uniformity control are deterring factors for the large scale synthesis of monodisperse gold nanoparticles.

Hyeon, T. et al. disclosed a synthesis method, without a size selection process, of monodisperse magnetic iron oxide nanoparticles from the thermal decomposition of iron-oleate complex prepared from the reaction of iron pentacarbonyl and oleic acid [Hyeon, T. et al., "Synthesis of Highly-Crystalline and Monodisperse Maghemite Nanocrystallites without a Size-Selection Process," J. Am. Chem. Soc. 2001, 123, 12798]. However, iron pentacarbonyl used as a precursor, is extremely toxic and the method is not suitable for the large scale production of monodisperse nanoparticles.

Puntes, V. et al. reported on the synthesis method of monodisperse cobalt nanoparticles from the thermal decomposition of dicobalt octacarbonyl[$CO_2(CO)_8$] in the presence of surfactants[Puntes, V. F. et al., "Colloidal Nanocrystal Shape and Size Control: The Case of Cobalt", Science 2001, 291, 2115]. However, use of expensive and highly toxic dicobalt octacarbonyl is a detrimental factor for synthesizing monodisperse nanoparticles in large quantity.

Sun, S. et al. reported on the synthesis of monodisperse nanoparticles of metal ferrites [$MFe_2O_4$, where M=Fe, Co or Mn] from the thermal decomposition of a mixture of metal acetates in the presence of oleic acid and oleylamine [Sun, S. et al., "Monodisperse $MFe_2O_4$ (M=Fe, Co, Mn) Nanoparticles", J. Am. Chem. Soc. 2004, 126, 273; Sun, S. et al., "Size-Controlled Synthesis of Magnetite Nanoparticles", J. Am. Chem. Soc. 2002, 124, 8204]. The use of expensive metal acetates prevents from synthesizing monodisperse nanoparticles in large quantity.

Jana, N. et al. disclosed a simple and generalized reaction system for synthesizing metal oxide nanoparticles through the pyrolysis of metal fatty acid salts [Jana, N. et al., "Size- and Shape-Controlled Magnetic (Cr, Mn, Fe, Co, Ni) Oxide Nanoparticles via a Simple and General Approach", Chem. Mater. 2004, 16, 3931].

Although this synthetic approach has some advantages over the prior arts cited above in that relatively safe and inexpensive metal fatty acid salts are employed, this method has a drawback of vary difficult and time consuming neutralization and purification steps to process through by employing one pot reaction from a mixture of metal salt, fatty acid and NaOH in order to obtain the metal fatty acid salts, thereby such drawback makes it difficult to synthesize the monodisperse nanoparticles in large quantity.

Also, Yu, W. et al. reported a method of producing monodisperse magnetite nanoparticles from the thermal decomposition of metal fatty acid salts using a very similar method as Jana, et al. described above [Yu, W. et al., "Synthesis of Monodisperse Iron Oxide Nanoparticles by Thermal Decomposition of Iron Carboxylate Salts", Chem. Comm. 2004, 2306].

In order to overcome the deficiencies of the prior arts, the present inventors had studied a novel process for synthesizing monodisperse nanoparticles in large quantity using inexpensive and non-toxic metal salts as reactants, where the process is suitable for synthesizing monodisperse nanoparticles in quantity of as much as 100 grams in a single reaction using 500 mL of solvent without a size selection process, and moreover, the size of the monodisperse nanoparticle is controlled simply by altering the synthesis conditions.

The present inventors have come to the completion of a novel process for making the monodisperse nanoparticles of various transition metals, metal alloys, metal oxides, and multimetallic oxides and its variations.

Therefore, the primary object of the present invention is to provide a novel process for making monodisperse nanoparticles of metals, metal alloys, metal oxides and multi-metallic oxides in large quantity from inexpensive and non-toxic metal salts without size-selection process.

DETAILED DESCRIPTION OF THE INVENTION

The above primary object of the present invention is achieved by providing a process, which comprises the steps of; i) reacting a metal salt dissolved in water with an alkali metal salt of $C_{4-25}$ carboxylic acid dissolved in a first solvent selected from the group consisting of $C_{5-10}$ aliphatic hydrocarbon and $C_{6-10}$ aromatic hydrocarbon to form a metal carboxylate complex; and ii) heating the metal carboxylate complex dissolved in a second solvent selected from the group consisting of $C_{6-25}$ aromatic, $C_{6-25}$ ether, $C_{6-25}$ aliphatic hydrocarbon and $C_{6-25}$ amine to produce the nanoparticles.

The present invention discloses large scale synthesis methods of producing uniform nanoparticles of metals, alloys, metal oxides and multimetallic oxides without a size-selection process, where said nanoparticles are mostly uniform in size as well as shape, thereby the resulting uniform nanoparticles posses the desired properties for various applications aforementioned.

The primary aspect of the present invention is a simple and environment-friendly synthetic method of producing monodisperse nanoparticles of metals, alloys, metal oxides and multimetallic oxides, where the nanoparticles are generated in large quantity at the level of about 100 grams.

The nanoparticles prepared through the process of the present invention, are re-dispersible in various solvents without being aggregated, and furthermore the nanoparticles can be assembled in 2-dimensional or 3-dimensional superlattices with long range orderness by slow evaporation, because the uniformity in size and shape allows the nanoparticles to form superlattices by self-assembly.

As a result the nanoparticles synthesized according to the present invention are potential candidates for high density magnetic memory device applications as high as in the range of terabits/in$^2$, and also for the bio-medical applications such as the contrast agents for the magnetic resonance imaging (MRI) and for drug delivery system (DDS) applications.

According to the present invention, the metal salts for synthesizing metal carboxylate complexes are composed of metal ions and anions, where the metal ions are selected from the group consisting of Fe, Co, Ti, V, Cr, Mn, Ni, Cu, Zn, Y, Zr, Mo, Ru, Rh, Pd, Ag, Cd, Ce, Pt, Au, Ba, Sr, Pb, Hg, Al, Ga, In, Sn or Ge, and the anions are selected from the group consisting of $C_{4-25}$ carboxylic acids.

The metal salts used for preparing metal carboxylate complexes are selected from the group consisting of hydrated iron(III) chloride [$FeCl_3.6H_2O$], hydrated iron(II) chloride [$FeCl_2.4H_2O$], hydrated cobalt(III) chloride [$CoCl_3.6H_2O$], hydrated cobalt(II) chloride [$CoCl_2.4H_2O$], hydrated chromium(III) chloride [$CrCl_3.6H_2O$], hydrated manganese(II) chloride [$MnCl_2.4H_2O$], iron(III) chloride [$FeCl_3$], iron(II) chloride [$FeCl_2$], iron(II) bromide [$FeBr_2$], iron(II) sulfate [$FeSO_4$], iron(III) nitrate [$Fe(NO_3)_3$], iron(II) stearate [$Fe(O_2C_{18}H_{35})_2$], iron(II) acetate [$FeOOCCH_3]_2$], cobalt(III) chloride [$CoCl_3$], cobalt(II) chloride [$CoCl_2$], cobalt(III) nitrate [$Co(NO_3)_3$], nickel(II) sulfate [$NiSO_4$], nickel(II) chloride [$NiCl_2$], nickel(II) nitrate [$Ni(NO_3)_2$], titanium tetrachloride [$TiCl_4$], zirconium tetrachloride [$ZrCl_4$], hydrogen hexachloroplatinate(IV)[$H_2PtCl_6$], hydrogen hexachloropalladiate(IV) [$H_2PdCl_6$], barium chloride [$BaCl_2$], barium sulfate [$BaSO_4$], strontium chloride [$SrCl_2$], strontium sulfate [$SrSO_4$], zinc acetate [$Zn(OOCH_3)_2$], manganese acetate [$Mn(OOCH_3)_2$], cerium(III) acetate hydrate [$(CH_3COO)_3Ce_3.xH_2O$], cerium(III) bromide hydrate [$CeBr_3.xH_2O$], cerium(III) chloride heptahydrate [$CeCl_3.7H_2O$], cerium(III) carbonate hydrate [$Ce_2(CO_3)_3.xH_2O$], cerium(III) fluoride hydrate [$CeF_3.xH_2O$], cerium(III) 2-ethylhexanoate [$CH_3(CH_2)_3CH(C_2H_5)CO_2]_3Ce$, cerium(III) iodide [$CeI_3$], cerium (III) nitrate hexahydrate [$Ce(NO_3)_3.6H_2O$], cerium(III) oxalate hydrate [$Ce_2(C_2O_4)_3.xH_2O$], cerium(III) perchlorate [$Ce(ClO_4)_3$], cerium(III) sulfate hydrate [$Ce_2(SO_4)_3.xH_2O$], iron acetylacetonate [$Fe(acac)_3$], cobalt acetylacetonate [$Co(acac)_3$], nickel acetylacetonate [$Ni(acac)_2$], copper acetylacetonate [$Cu(acac)_2$], barium acetylacetonate [$Ba(acac)_2$], strontium acetylacetonate [$Sr(acac)_2$], cerium(III) acetylacetonate hydrate [$(acac)_3Ce.XH_2O$], platinum acetylacetonate [$Pt(acac)_2$], palladium acetylacetonate [$Pd(acac)_2$], titanium tetraisopropoxide [$Ti(^iOC_3H_7)_4$] and zirconium tetrabutoxide [$Zr(OC_4H_9)_4$].

In synthesizing monodisperse nanoparticles of alloys and multi-metal oxides, mixtures of two or more compounds mentioned above are used as metal salts according to the present invention.

In order to form the metal carboxylate complex solution in step ii) of the present invention, the following solvents are used to dissolve the metal carboxylate complexes; the ethers, i.e., octyl ether, butyl ether, hexyl ether, benzyl ether, phenyl ether and decyl ether, and the aromatic compounds, i.e., toluene, xylene, mesitylene and benzene, and the alcohols, i.e., octylalcohol, decanol, hexadecanol, ethylene glycol, 1,2-octanediol, 1,2-dodecanediol and 1,2-hexadecanediol, and the hydrocarbons, i.e., heptane, octane, decane, dodecane, tetradecane, eicosene, octadecene, hexadecane, dimethyl sulfoxide (DMSO) and dimethylformamide (DMF), and the alkylamines, i.e., oleylamine, hexadecylamine trioctylamine and octylamine.

According to the present invention, the metal-carboxylate complex solution is heated to a temperature between 200° C. and the boiling temperature of the second solvent, and also the metal-carboxylate complex solution is heated at a heating rate between 1° C./min. and 200° C./min.

According to the present invention the metal-carboxylate complex solution is aged at a temperature between 200° C. and the boiling temperature of the second solvent, and more preferably between 300° C. and the boiling temperature of the second solvent, and for time duration between 1 minute and 24 hours, and more preferably between 1 minute and 1 hour.

According to the present invention, the size and shape of the monodisperse nanoparticles of metals, metal oxides, alloys, and multi-metallic oxides are readily controlled by varying the reaction parameters of the amount of surfactants, the variation of solvents, the aging temperature, and the heating rate.

Furthermore, according to the present invention, the size of monodisperse nanoparticles of metals, metal oxides, alloys, and multi-metallic alloys are also controlled by varying the ratio of the metal-carboxylate complex to the surfactant, wherein the molar ratio of the metal-carboxylate complex to the surfactant ranges from 1:0.1 to 1:100, and more preferably from 1:0.1 to 1:20.

According to the present invention, the size of the monodisperse nanoparticles of metals, metal oxides, alloys, and multi-metallic oxides are further controlled by the variation of the second solvents with different boiling points (b.p.). For example, when the iron-oleate complex was aged in 1-hexadecene (b.p.=274° C.), octyl ether (b.p.=287° C.), 1-octadecene (b.p.=317° C.), 1-eicosene (b.p.=330° C.), and trioctylamine (b.p.=365° C.) as solvents, the monodisperse iron oxide nanoparticles with various diameters of approximately 5, 9, 12, 16, and 22 nm, were respectively produced.

According to the present invention, the monodisperse nanoparticles of metals, metal oxides, alloys and multi-metallic oxides are retrieved by adding a flocculent to precipitate out of the solution, and followed by centrifugation, where a flocculent is a solvent that does not disperse the nanoparticles effectively and induce the precipitation of the nanoparticles out of the solution.

Among the nanoparticles synthesized according to the present invention, the magnetic nanoparticles of iron oxide and iron nanoparticles exhibit the characteristics of typical superparamagnetism as shown in FIG. 18.

Furthermore, the magnetic nanoparticles larger than 16 nm in diameter exhibit the property of ferromagnetism or ferrimagnetism at room temperature with high magnetic moment sufficient to be used as magnetic data storage media, and thus have potentially many uses in industrial applications.

BRIEF DESCRIPTION OF THE DRAWINGS

The above objects and other advantages of the present invention will become more apparent by describing in detail a preferred example thereof with reference to the attached drawings, in which.

BEST MODES FOR CARRYING OUT THE INVENTION

According to the present invention, the monodisperse nanoparticles of metals, metal oxides, alloys, and multi-metallic oxides are synthesized in large quantity, where such nanoparticles exhibit an excellent magnetic property for magnetic data storage media applications and such property is demonstrated by measuring the temperature dependence of magnetization for various sizes of metal oxide nanoparticles synthesized.

The implementations and the corresponding procedures of the best modes of carrying out the present invention are described in the following. However, the implementations and procedures presented here are merely illustrative examples of carrying out the implementation of the underlying ideas of the present invention. The exemplary Examples given in the following are neither intended for exhaustively illustrating the basic ideas and procedures nor limiting the scope of the present invention. Furthermore, those who are familiar with the art should be able to easily derive variations and modifications of the underlying ideas and their implementations of the present invention.

Example 1

Synthesis of Iron-Oleate Complex

Figure 1:
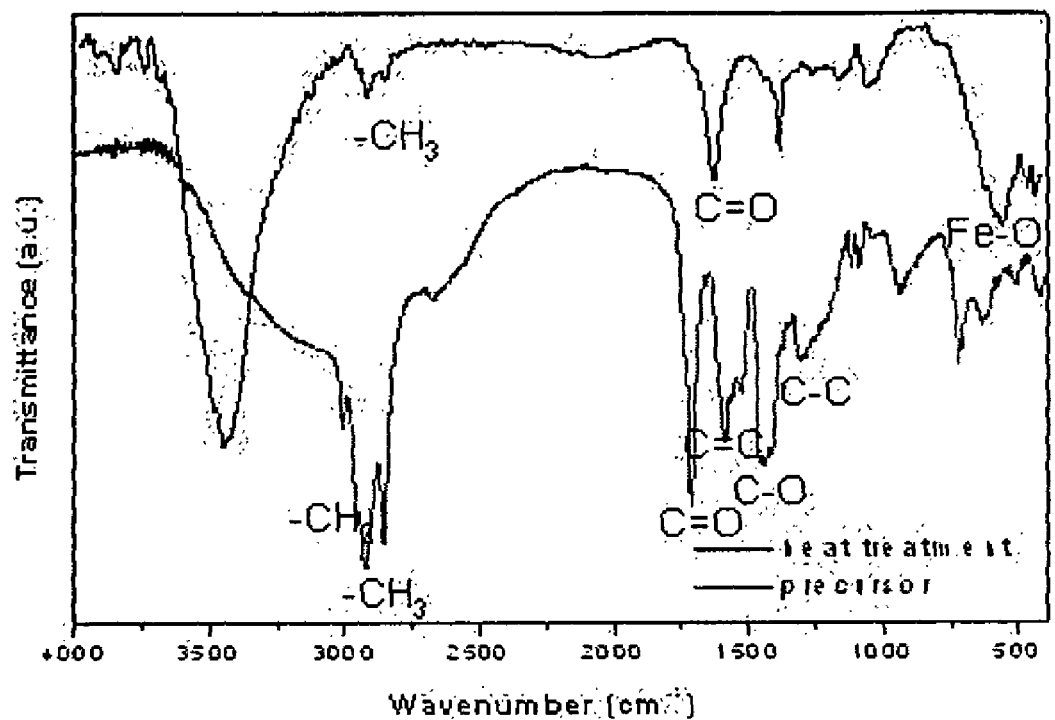
FIG. 1 is the FT-IR spectra of the iron-oleate complex (solid curve) and the same complex after heating at 380° C. (dotted curve), indicating that the iron oxides are generated according to the present invention.

As the first exemplary example for demonstrating the method of synthesizing monodisperse nanoparticles according to the present invention, 10.8 g of iron chloride [$FeCl_3 \cdot 6H_2O$, 40 mmol] and 36.5 g of sodium oleate (120 mmol) were dissolved in a mixture of solvents containing 80 mL of ethanol, 60 mL of distilled water, and 140 mL of hexane, and thereafter the resulting mixture was heated to 70° C. and kept at the same temperature for 4 hours to obtain an iron-oleate complex. During this process, the initial scarlet color in aqueous phase became clear, and the initial transparent organic phase turned to scarlet, indicating that iron-oleate complex was successfully synthesized. When the reaction was completed, the upper organic layer containing the metal-oleate complex was separated and thereafter the hexane was evaporated off, resulting in a waxy solid form. In FIG. 1, the FT-IR spectrum of the resulting iron-oleate complex shows a C=O stretching peak at 1700 $cm^{-1}$, which is a unique characteristics for a metal-oleate complex.

Example 2

Synthesis of Monodisperse and Spherically Shaped Iron Oxide Nanoparticles in Large Quantity—(A)

As a first exemplary example of the ultra-large scale synthesis of monodisperse and spherically-shaped iron oxide nanoparticles according to the present invention disclosed here, 36 g of iron oleate complex synthesized according to example 1 was added to a mixture containing 200 g of dehydrated octadecene and 5.7 g of oleic acid under inert atmosphere at room temperature.

The resultant mixture was heated to 320° C. and then was aged for 30 min. maintaining the same temperature, during which process, a violent reaction took place, and the initial transparent solution became brownish black, indicating that the iron oleate complex was decomposed completely, and iron oxide nanoparticles were generated.

The resulting solution containing the nanoparticles was cooled to the room temperature, excess ethanol was added to yield a black precipitate, and then separated by centrifuging.

Thereafter, the resulting supernatant was discarded. This washing process was repeated at least three times and then the ethanol contained in the remainder was removed by vacuum drying.

The resulting product was easily re-dispersed in hexane to form the desired iron nanoparticles. The results of the observation and data analysis of the resultant iron nanoparticles of 12 nm in diameter are presented in the following.

Figure 2:
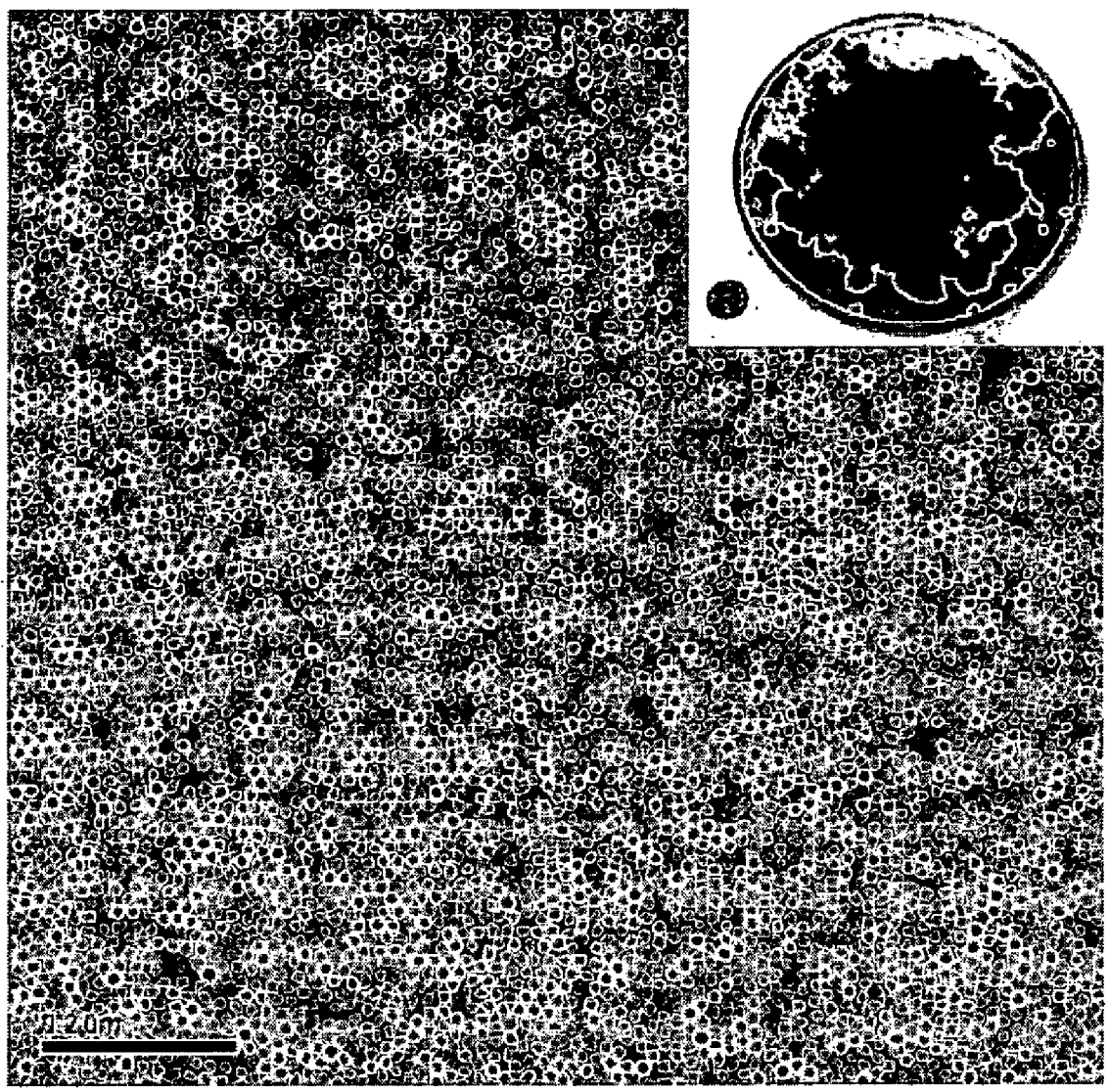
FIG. 2 is an exemplary TEM image of the spherical iron oxide nanoparticles of 12 nm in diameter synthesized according to Example 2 in large quantity. The Inset at the upper-right corner is a photograph showing 40 grams of the monodisperse iron oxide nanoparticles on a Petri dish.

In FIG. 2, shown is the TEM (Transmission Electron Microscope) image of the resulting iron nanoparticles, which image is an exemplary TEM picture of the spherical iron oxide nanoparticles of 12 nm in diameter, where the image demonstrates that the resulting nanoparticles are spherically-shaped and their particle sizes are monodisperse.

Figure 3:
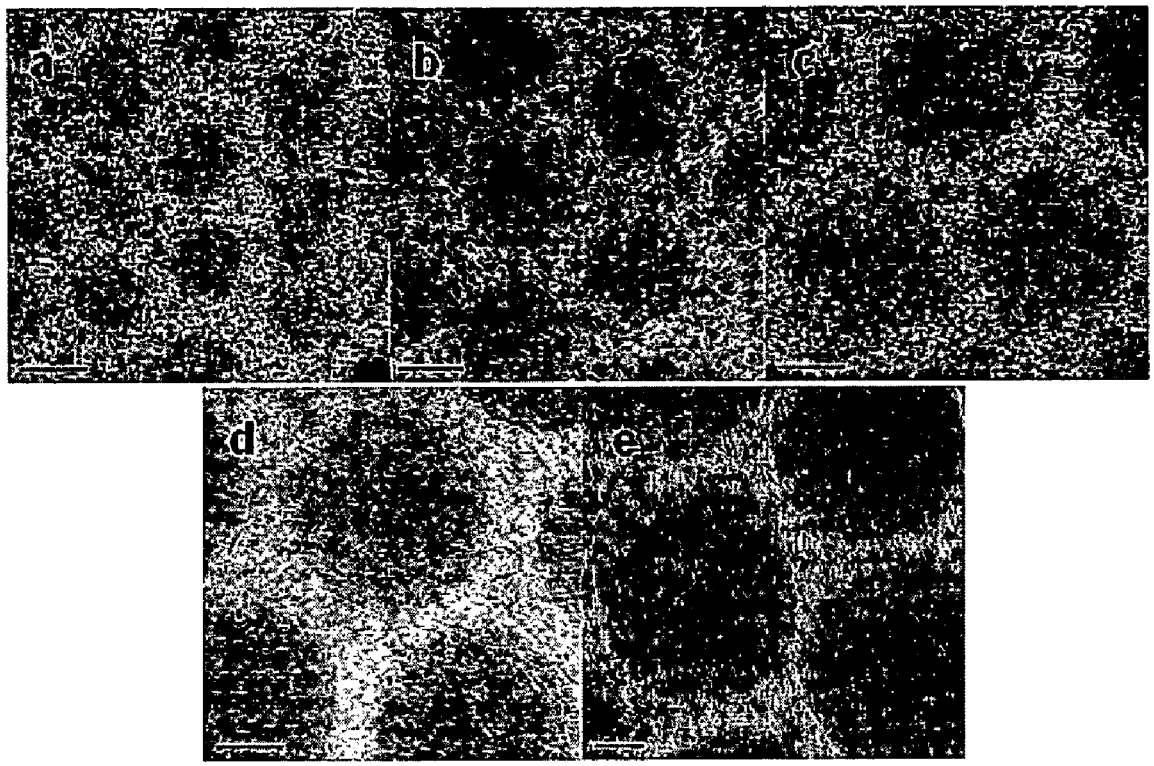
FIGS. 3a, 3b, 3c, 3d, 3e are the exemplary high resolution TEM (HRTEM) images of the iron oxide nanoparticles in various sizes in diameter of (a) 5 nm, (b) 9 nm, (c) 12 nm, (d) 16 nm and (e) 22 nm synthesized according to the Examples 3, 4, 2, 5 and 6, respectively.

In FIG. 3c, the High-Resolution Transmission Electron Microscope (HRTEM) image of the monodisperse spherical iron oxide (magnetite) nanoparticles of 12 nm is shown, indicating that the resulting nanoparticles are highly crystalline.

Figure 4:
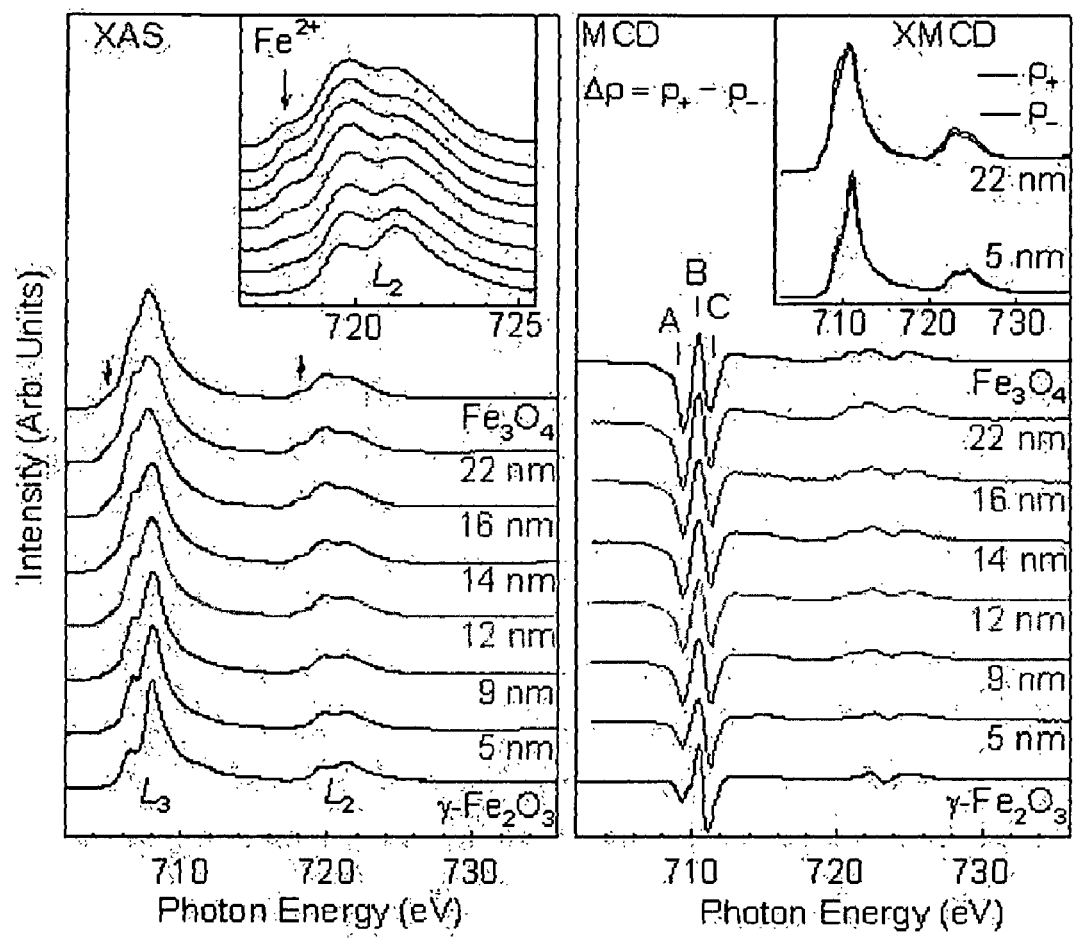
FIG. 4 show two graphs of the Fe $L_{2,3}$-edge X-ray absorption spectra (XAS) (the left graph) and X-ray magnetic circular dichroism (XMCD) spectra (the right graph) of the iron oxide nanoparticles of 5 nm, 9 nm, 12 nm, 16 nm, and 22 nm in diameter synthesized according to the Examples 3, 4, 2, 5 and 6, respectively, wherein, for comparison, XAS and XMCD spectra of the reference bulk materials, $\gamma$-$Fe_2O_3$ and $Fe_3O_4$ are also shown. The magnified XAS spectra of the $L_2$ region and the XMCD spectra of the nanoparticles of 5 nm and 22 nm in diameter are also shown, respectively, in the insets of FIG. 4.

FIG. 4 shows the XAS spectra (left) and the XMCD spectra (right) of the iron oxide nanoparticles of 12 nm in diameter along with two reference materials, bulk $\gamma$-$Fe_2O_3$ (maghemite) and bulk $Fe_3O_4$ (magnetite) for comparison, which reference materials have nearly the same spinel crystal structure with only about 1% difference in terms of the cubic lattice constant. From the results of XAS and XMCD data, a quantitative estimation of the compositions for the iron oxide nanoparticles in the form of ($\gamma$-$Fe_2O_3$)$_{1-x}$($Fe_3O_4$)$_x$, whereby the estimation is x=0.68 for the nanoparticles of 12 nm in diameter.

Figure 5:
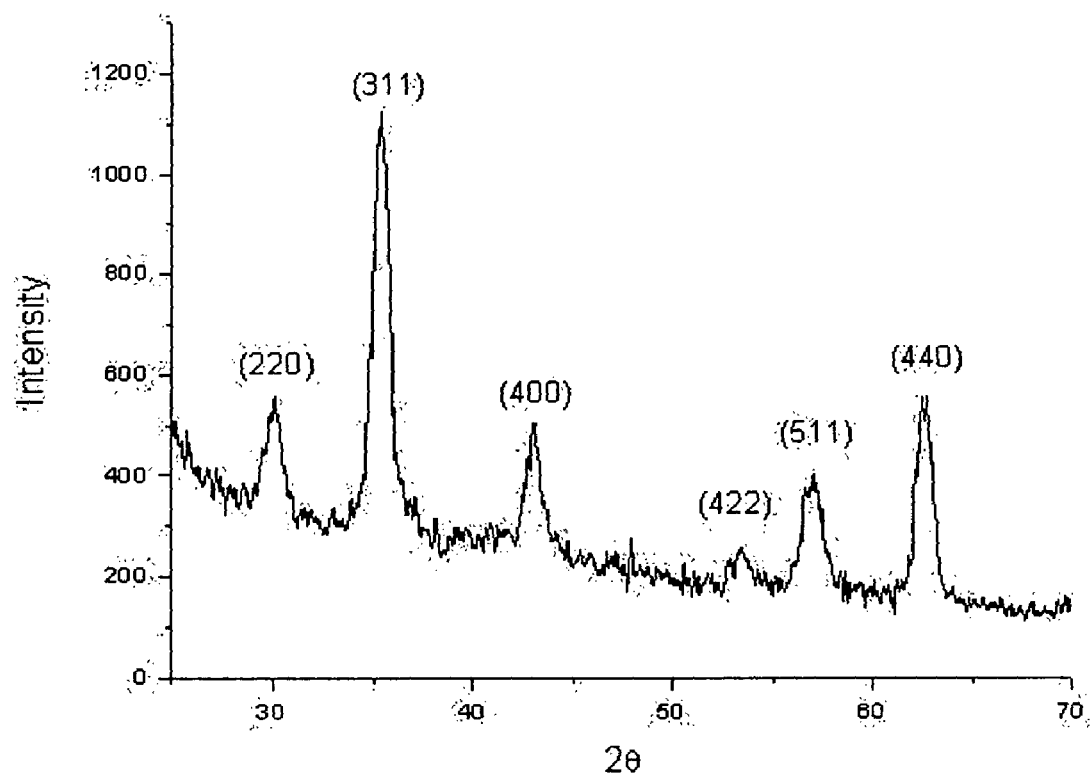
FIG. 5 is an exemplary powder X-ray diffraction (XRD) pattern of the spherical iron oxide nanoparticles of 12 nm in diameter synthesized according to Example 2.

In FIG. 5 shown is an exemplary powder X-ray diffraction (XRD) pattern of the spherical iron oxide nanoparticles of 12 nm in diameter synthesized in Example 2, wherein the XRD pattern of the resultant magnetite ($Fe_3O_4$) nanoparticles demonstrates that the nanoparticles are highly crystalline.

Example 3

Synthesis of Monodisperse Spherical Iron Oxide Nanoparticles in Large Quantity—(B)

In order to synthesize monodisperse and spherically shaped iron oxide nanoparticles of 5 nm in diameter according to the present invention, a procedure similar to Example 2 above, was carried out; 18 g of iron oleate complex was added to a mixture containing 100 g of dehydrated hexadecane and 5.7 g of oleic acid under an inert atmosphere and the resulting mixture was heated to 280° C. and then aged the mixture for 1 hour at the reflux temperature, whereby the colloidal iron oxide nanoparticles of 5 nm in diameter were formed. The resulting solution was cooled to room temperature.

Then ethanol was added to wash, resulting in a black precipitate, followed by centrifugation at the revolving speed of 2000 rpm, retrieving the precipitated nanoparticles. Thereafter, this washing process was repeated at least three times, and the ethanol was removed by vacuum drying to yield the desired iron oxide nanoparticles in spherical shape. The resulting nanoparticles are readily re-dispersed in nonpolar organic solvents such as hexane or toluene.

Figure 6:
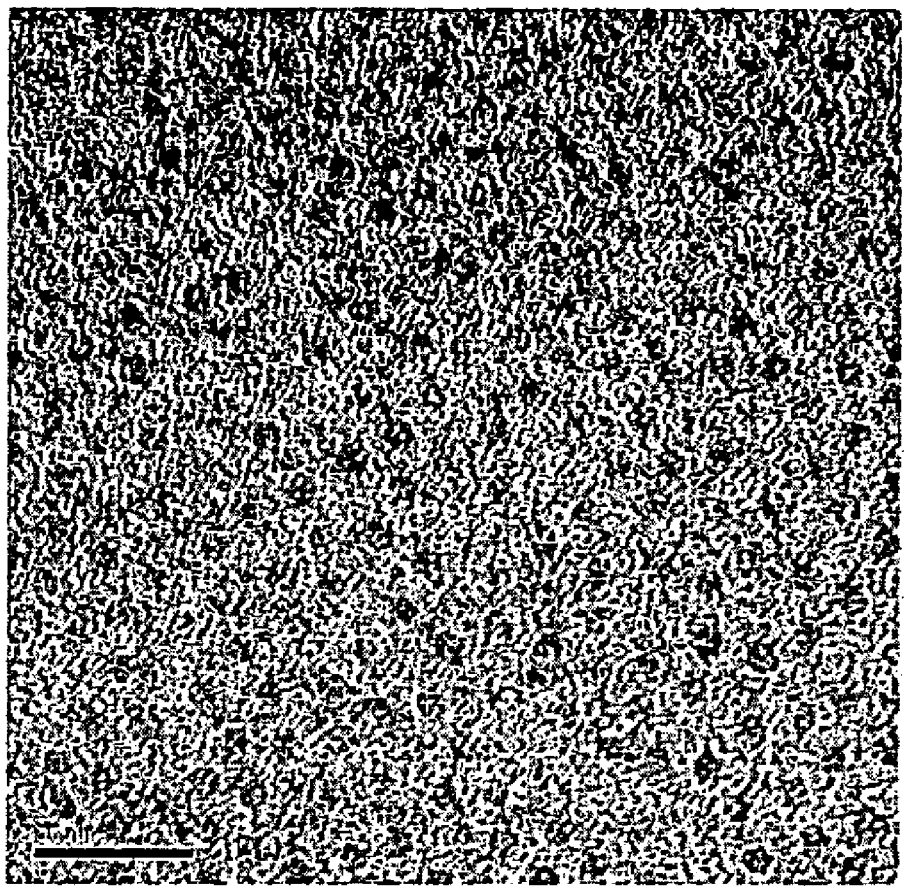
FIG. 6 is an exemplary TEM image of the spherical iron oxide nanoparticles of 5 nm in diameter in large quantity synthesized according to Example 3.

In FIG. 6, shown is the TEM image of the resulting nanoparticles, illustrating that the resulting spherical iron oxide nanoparticles of 5 nm in diameter synthesized in this Example 3 are nearly monodisperse in terms of the particle size.

The high-resolution transmission electron microscope (HRTEM) image of the monodisperse spherical iron oxide (magnetite) nanoparticles of 5 nm in diameter shown in FIG. 3a indicates that the nanoparticles are highly crystalline FIG. 4 shows the graphs of the XAS spectra (the left graph) and the XMCD spectra (the right graph) for the monodisperse iron oxide nanoparticles of 5 nm in diameter in comparison with two reference materials, bulk $\gamma$-$Fe_2O_3$ (maghemite) and bulk $Fe_3O_4$ (magnetite), illustrating that the resulting nanoparticles have nearly the same spinel crystal structure as the references with a difference of merely about 1% in terms of the cubic lattice constant.

Both XAS and MCD spectra of the resulting nanoparticles of 5 nm in diameter are very similar to those of $\gamma$-$Fe_2O_3$, containing only $Fe^{3+}$. From the XAS and XMCD spectra data, a quantitative estimation of the compositions for the resulting iron oxide nanoparticles in the form of ($\gamma$-$Fe_2O_3$)$_{1-x}$($Fe_3O_4$)$_x$ was made, resulting in x=0.20 for the resulting nanoparticles of 5 nm in diameter. Therefore, it is concluded that the γ-Fe$_2$O$_3$ phase is the dominant phase in the resulting iron oxide nanoparticles of 5 nm in diameter.

Example 4

Synthesis of Monodisperse Spherical Iron Oxide Nanoparticles in Large Quantity—(C)

Monodisperse spherical iron oxide nanoparticles of 9 nm in diameter were synthesized using the same reaction conditions described in Example 3, except that the solvent used was replaced with octyl ether and the final aging temperature was set at 300° C.

Figure 7:
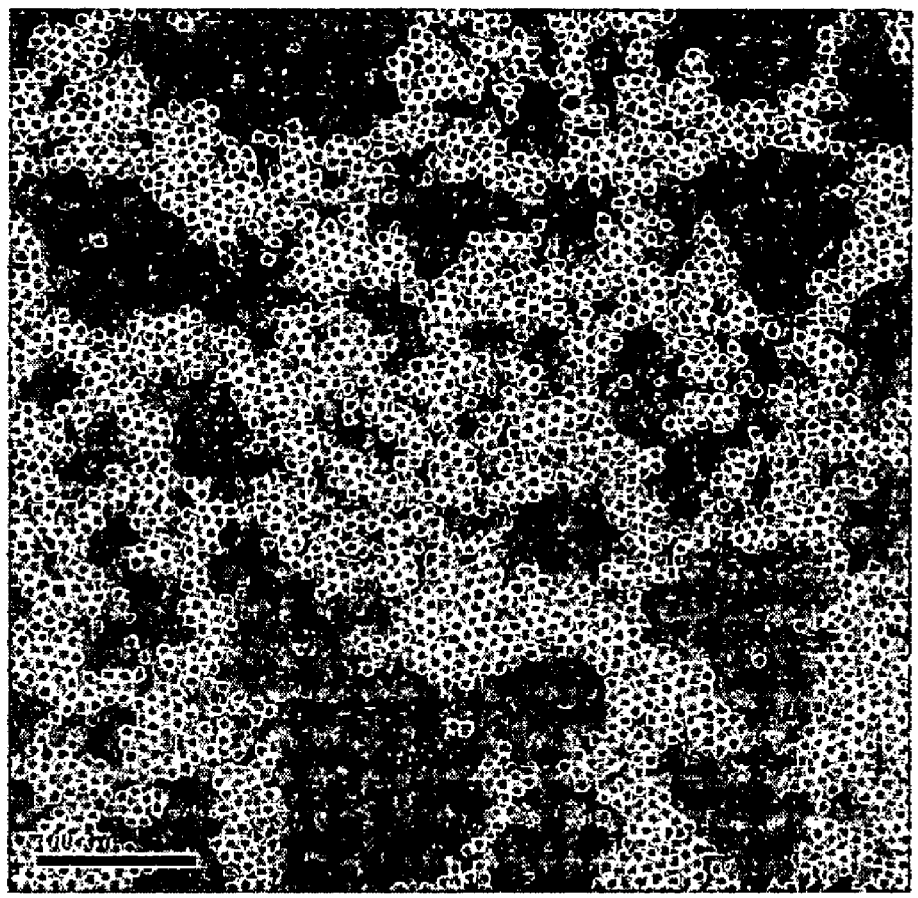
FIG. 7 is an exemplary TEM image of the spherical iron oxide nanoparticles of 9 nm in diameter synthesized in large quantity according to Example 4.

The TEM image of the resulting monodisperse spherical iron oxide nanoparticles of 9 nm in diameter is shown in FIG. 7, demonstrating that the spherical iron oxide nanoparticles are monodisperse in particle size.

The high-resolution transmission electron microscope (HRTEM) image of the resulting monodisperse spherical iron oxide (magnetite) nanoparticles of 9 nm in diameter shown in FIG. 3b illustrates that the resulting nanoparticles are highly crystalline.

FIG. 4 shows the XAS spectra (the left graph) and the XMCD spectra (the right graph) of the resulting iron oxide nanoparticles of 9 nm in diameter as well as those of two reference materials, bulk γ-Fe$_2$O$_3$ (maghemite) and bulk Fe$_3$O$_4$ (magnetite) for comparison, where the resulting nanoparticles have nearly the same spinel crystal structure as the reference materials with s difference of merely about 1% in terms of the cubic lattice constant. From the resulting XAS and XMCD spectral data, a quantitative estimation of the compositions for the resulting iron oxide nanoparticles are made in the form of (γ-Fe$_2$O$_3$)$_{1-x}$(Fe$_3$O$_4$)$_x$, resulting in x=0.57 for the nanoparticles of 9 nm in diameter.

Example 5

Synthesis of Monodisperse Spherical Iron Oxide Nanoparticles in Large Quantity—(D)

Monodisperse spherical iron oxide nanoparticles of 16 nm in diameter were synthesized using the same reaction conditions described in Example 3, except that the solvent used is replaced with 1-eicosene and the final reaction temperature is set at 330° C.

Figure 8:
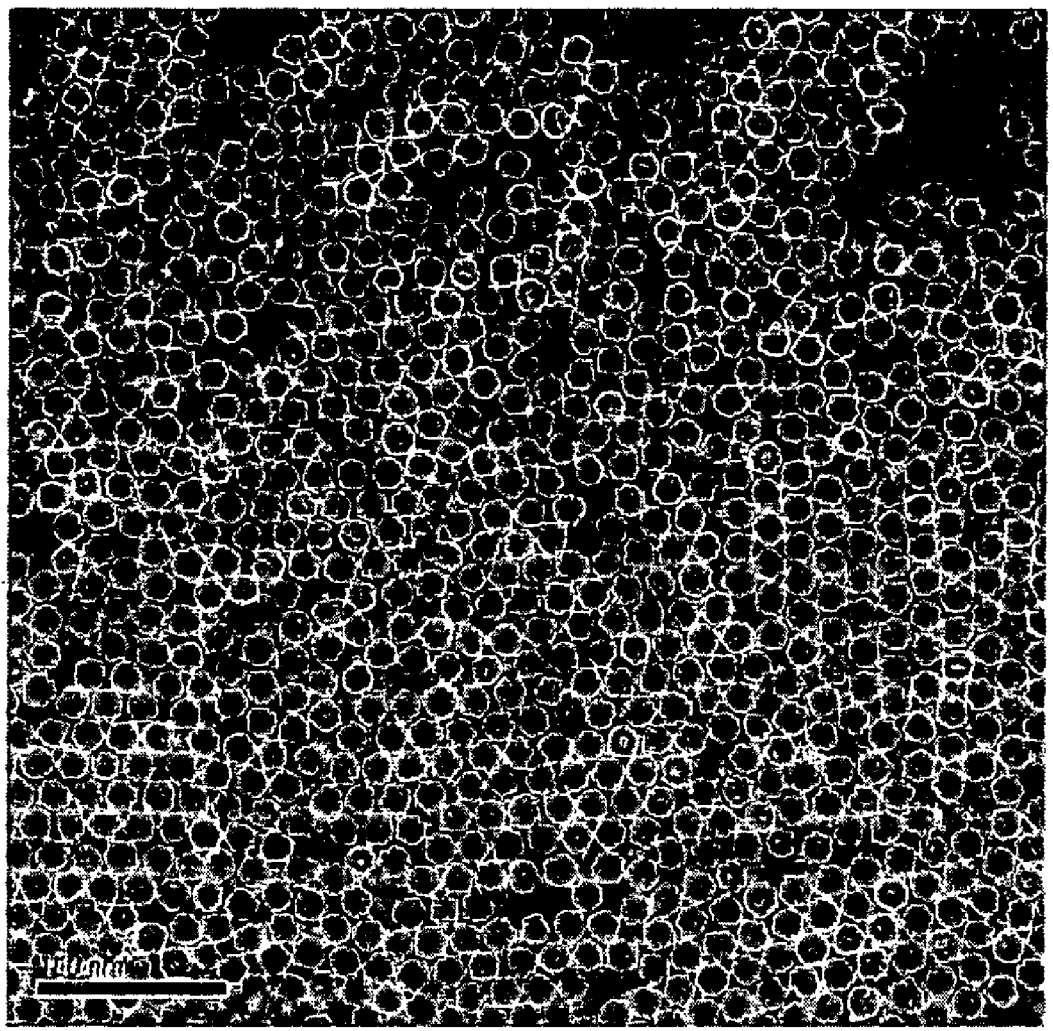
FIG. 8 is an exemplary TEM image of the spherical iron oxide nanoparticles of 16 nm in diameter in large quantity synthesized according to Example 5.

An exemplary TEM image of the spherical iron oxide nanoparticles of 16 nm in diameter synthesized according to the present invention is shown in FIG. 8, indicating that the 16 nm spherical iron oxide nanoparticles are monodisperse in particle size.

In FIG. 3d, the high-resolution transmission electron microscope (HRTEM) image of monodisperse 16 nm size spherical iron oxide (magnetite) nanoparticles shows highly crystalline nature in the nanoparticle structure.

FIG. 4 show the XAS spectra and XMCD results of the synthesized iron oxide nanoparticles with diameter of 16 nm as well as those of two reference materials, bulk γ-Fe$_2$O$_3$ (maghemite) and bulk Fe$_3$O$_4$ (magnetite) for comparison, illustrating that the resulting nanoparticles have nearly the same spinel crystal structure with a difference of merely 1% in terms of the cubic lattice constant. From the results of the XAS and XMCD graphs, a quantitative estimation of the compositions for the resulting iron oxide nanoparticles in the form of (γ-Fe$_2$O$_3$)$_{1-x}$(Fe$_3$O$_4$)$_x$ was made, indicating that x=0.86 for the synthesized 16 nm size nanoparticles.

Example 6

Synthesis of Monodisperse Spherical Iron Oxide Nanoparticles with a Large Quantity—(E)

Monodisperse spherical iron oxide nanoparticles of 22 nm in diameter were synthesized using the same reaction conditions described in Example 3, except that the solvent used is replaced with trioctylamine and the final reaction temperature is set at 360° C.

Figure 9:
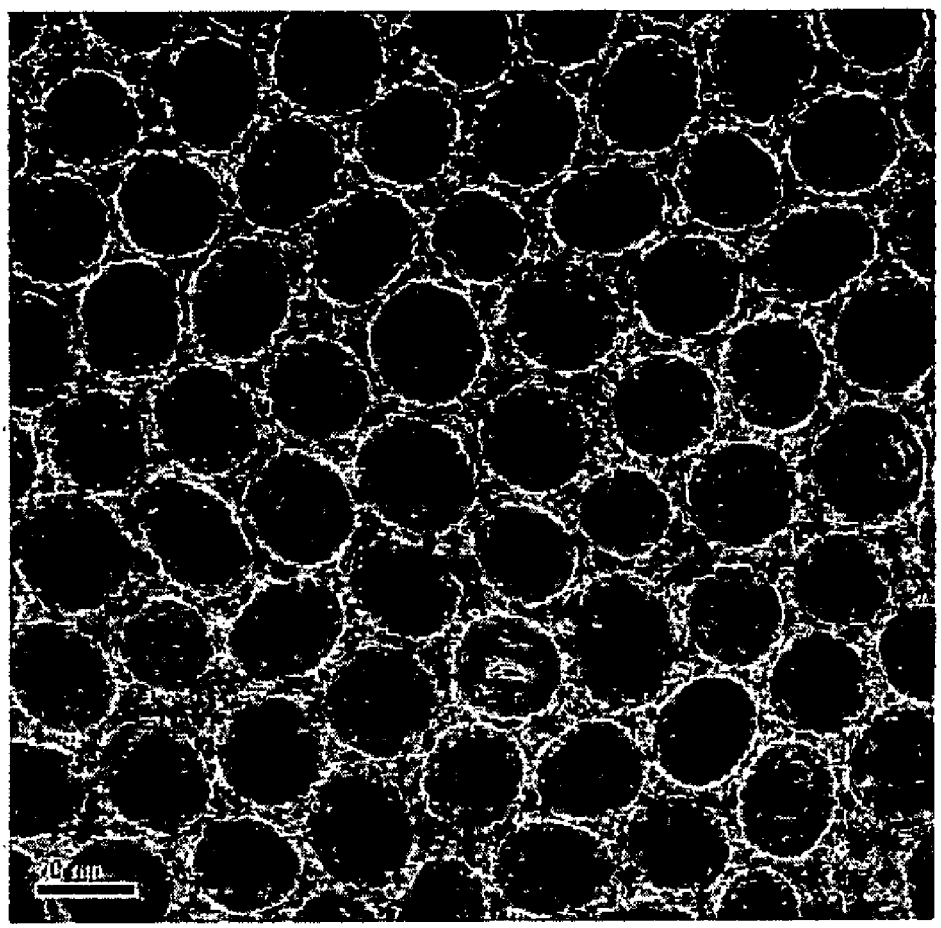
FIG. 9 is an exemplary TEM image of the spherical iron oxide nanoparticles of 22 nm in diameter in large quantity synthesized according to Example 6.

In FIG. 9, an exemplary TEM image of the 22 nm size spherical iron oxide nanoparticles synthesized according to the present invention is as shown, indicating that the 22 nm spherical iron oxide nanoparticles are monodisperse in particle size.

In FIG. 3e, the high-resolution transmission electron microscope (HRTEM) image of monodisperse 22 nm size spherical iron oxide (magnetite) nanoparticles shows highly crystalline nature of the 22 nm size nanoparticles.

FIG. 4 shows the results of the XAS spectra and XMCD measurements of the iron oxide nanoparticles with diameter of 22 nm as well as those of two reference materials, bulk γ-Fe$_2$O$_3$ (maghemite) and bulk Fe$_3$O$_4$ (magnetite) for comparison, Illustrating that the synthesized 22 nm size spherical iron oxide nanoparticles have nearly the same spinel crystal structure as the reference materials with a difference of merely about 1% in terms of the cubic lattice constant. From the XAS and XMCD data, a quantitative estimation of the compositions for the resulting iron oxide nanoparticles in the form of (γ-Fe$_2$O$_3$)$_{1-x}$(Fe$_3$O$_4$)$_x$. was made, resulting in x=1.00 for the 22 nm size nanoparticles, thereby indicating that the synthesized 22 nm size nanoparticles are pure magnetite.

Example 7

Synthesis of Monodisperse Manganese Oxide Nanoparticles

Monodisperse cubically shaped manganese oxide (MnO) nanoparticles of 12 nm in diameter were synthesized according to the present invention, following a similar procedure described in Example 2 above; 1.24 g of manganese oleate was added to a solution containing 10 g of dehydrated 1-octadecene under an inert atmosphere, the resulting mixture was heated to 320° C. and aged for 1 hour at the reflux temperature to form brownish black colloidal manganese nanoparticles.

Figure 10:
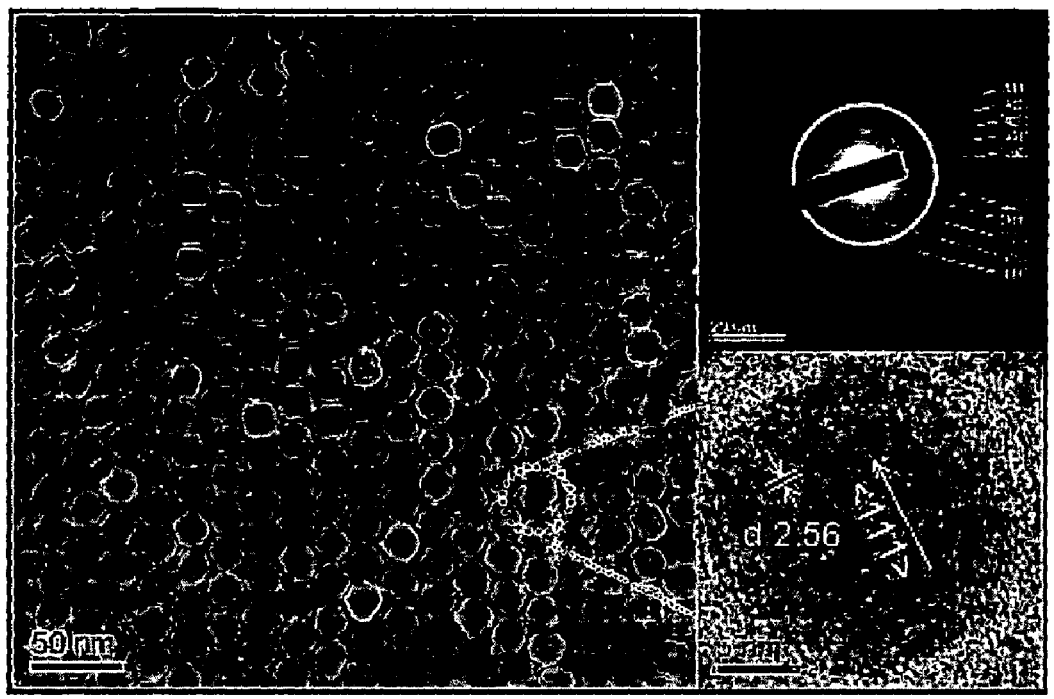
FIG. 10 is an exemplary TEM image of the cube-shaped manganese oxide nanoparticles of 12 nm in diameter, where the insets at top-right and bottom-right are the electron diffraction pattern and the high resolution TEM image of MnO nanoparticles, respectively, synthesized according to Example 7.

In FIG. 10, an exemplary TEM image of the 12 nm cubically shaped manganese oxide nanoparticles synthesized according to present invention is shown, illustrating that the nanoparticles are very uniform in diameter size.

Figure 11:
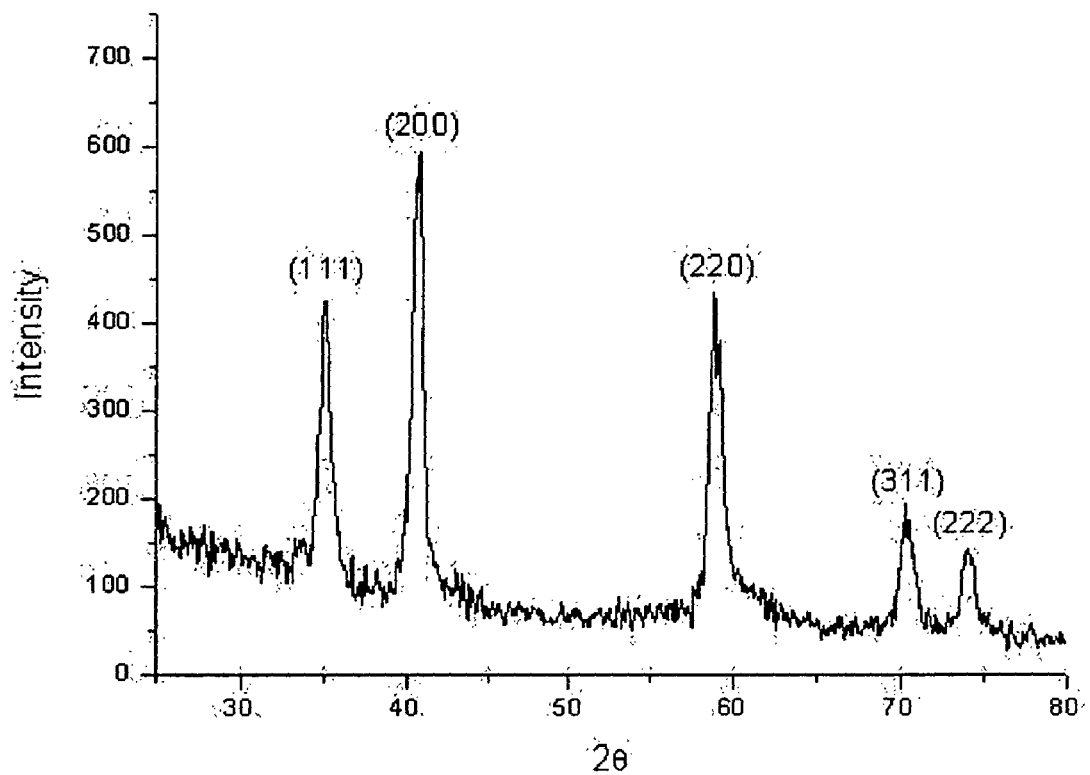
FIG. 11 is an exemplary powder X-ray diffraction (XRD) pattern of the cube-shaped manganese oxide nanoparticles of 12 nm in diameter synthesized according to Example 7.

FIG. 11 is an exemplary powder X-ray diffraction (XRD) pattern of the 12 nm size cubically shaped manganese oxide nanoparticles, illustrating that the MnO nanoparticles of the face-center cube (fcc) shape were synthesized following the procedure in Example 7.

Example 8

Synthesis of Monodisperse Cobalt Oxide (CoO) Nanoparticles

Monodisperse bullet-shaped cobalt oxide (CoO) nanoparticles were synthesized according to the present invention by using a process similar to the procedure described in Example 2 above; 1.25 g of cobalt oleate was added to a solution containing 10 g of dehydrated 1-octadecene under an inert atmosphere and the resulting mixture was heated to 320° C. and aged for 1 hour at the reflux temperature, resulting in forming pale brown colloidal cobalt oxide nanoparticles. In the case of cobalt oxide, it is known to have an intrinsic crystalline anisotropy, and it is seen that the cobalt oxide nanoparticles grow preferentially along the c-axis.

Figure 12:
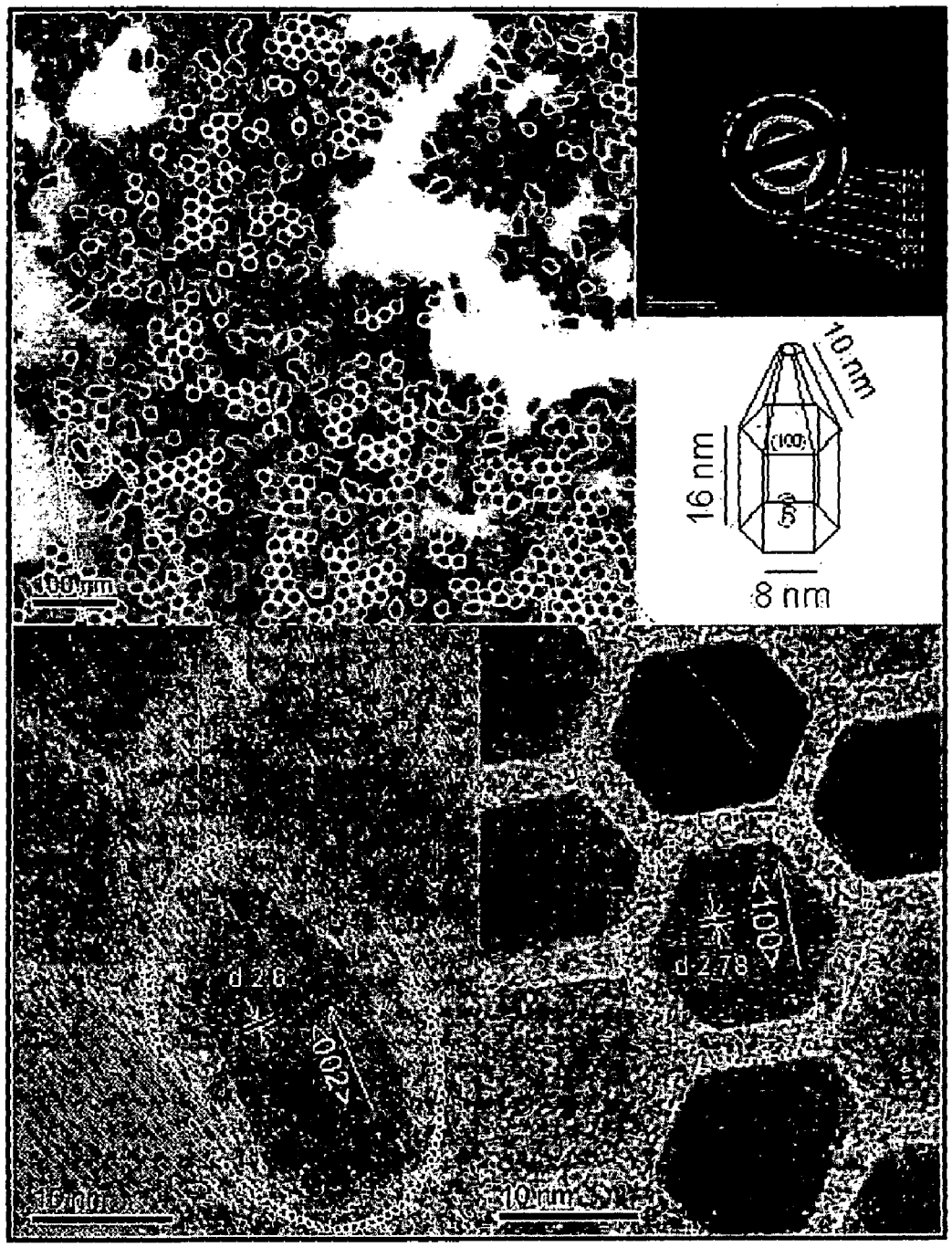
FIG. 12 is an exemplary TEM image, shown at top-left, of the pencil-shaped cobalt oxide (CoO) nanoparticles synthesized according to Example 8, and the insets at top-right and middle-right are the electron diffraction patterns and a schematic model of the same nanoparticles, respectively. The bottom-left and bottom-right are the high resolution TEM images projected in <002> and <100> directions, respectively.

In FIG. 12, an example of TEM image of the bullet-shaped cobalt oxide nanoparticles synthesized according to present invention and their 2-dimensional array are shown. The TEM image of FIG. 12 reveals that the bullet-shaped cobalt oxide nanoparticles are monodisperse and they form honeycomb-shaped and self-assembled superlattice structures. Also, the electron diffraction pattern, shown in the top-right inset of FIG. 12, indicates that the synthesized bullet-shaped cobalt oxide nanoparticles possess the Wurtzite crystal structure. In addition, the high-resolution transmission electron microscope (HRTEM) of the bullet shaped cobalt oxide nanoparticles, shown at the bottom of FIG. 12, illustrates that the nanoparticles are highly crystalline.

Figure 13:
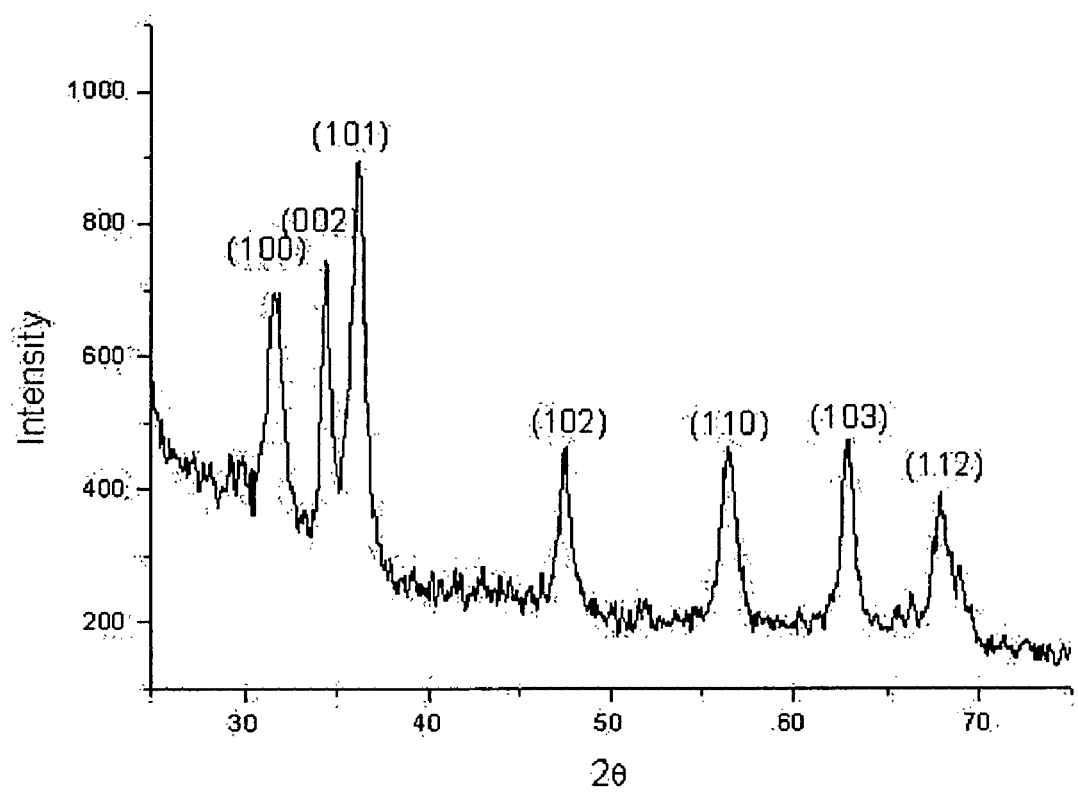
FIG. 13 is an exemplary powder X-ray diffraction (XRD) pattern of the pencil-shaped cobalt oxide (CoO) nanoparticles synthesized according to Example 8.

FIG. 13 is an exemplary powder X-ray diffraction (XRD) pattern of the pencil-shaped cobalt oxide nanoparticles, illustrating also that the cobalt oxide nanoparticles possess the Wurtzite structure similar to that of ZnO.

Example 9

Synthesis of Monodisperse Iron Nanoparticles

Monodisperse cubically shaped 20 nm size iron nanoparticles were synthesized according to the present invention using a similar procedure described in Example 2 above; 1.24 g of iron oleate complex was added to a solution containing 5 g of dehydrated oleic acid in 50 mL in a round bottom flask under an inert atmosphere and the resulting mixture was heated to 370° C. and aged for 1 hour at the same temperature, resulting in forming black colloidal iron nanoparticles. It should be noted that when the thermal decomposition of iron oleate complexes took place at a higher temperature of 350° C., for example, in the present invention, the nanoparticles were self-reduced to iron.

Figure 14:
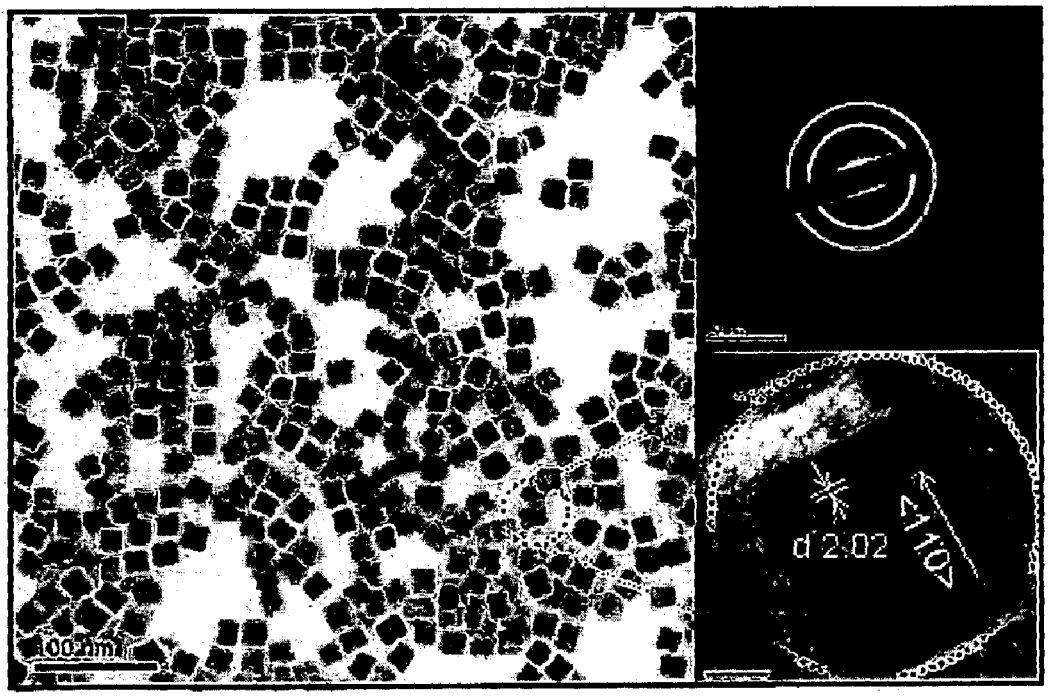
FIG. 14 is an exemplary TEM image of the cube-shaped iron (Fe) nanoparticles of 20 nm in diameter synthesized according to Example 9, and the insets at the top-right and bottom-right are the electron diffraction pattern and the high resolution TEM image of the same Fe nanoparticles, respectively.

In FIG. 14, an example of TEM image of the cubically shaped 20 nm size iron nanoparticles synthesized according to present invention is shown, illustrating that the nanoparticles are very uniform in diameter size.

The electron diffraction pattern, shown in the top-right inset of FIG. 14, indicates that the synthesized 20 nm size iron nanoparticles possess the body-centered cubic (bcc) crystal structure. In addition, the high-resolution transmission electron microscope (HRTEM) of the 20 nm size iron nanoparticles, shown in the bottom-right inset of FIG. 14, indicates that the resulting nanoparticles are highly crystalline and the surface of the 20 nm size iron nanoparticles is passivated by a thin layer of FeO.

Figure 15:
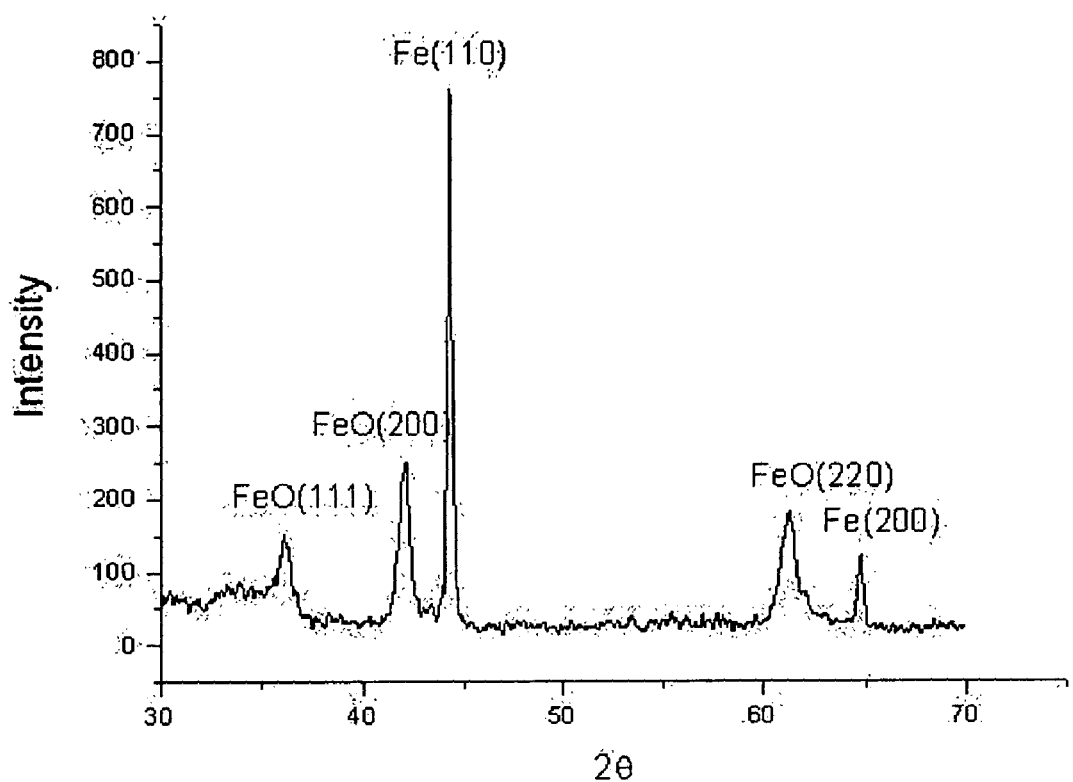
FIG. 15 is an exemplary powder X-ray diffraction (XRD) pattern of the cube-shaped iron (Fe) nanoparticles of 20 nm in diameter synthesized according to Example 9.

FIG. 15 is an exemplary powder X-ray diffraction (XRD) pattern of the 20 nm size cube-shaped iron nanoparticles, indicating that the highly crystalline body-centered cubic (bcc) iron core is passivated by a thin surface layer of FeO.

Example 10

Synthesis of Monodisperse Spherical Cobalt Ferrite ($CoFe_2O_4$) Nanoparticles

Following the synthesis procedure described in Example 1 above, 1.22 g of iron/cobalt oleate complex that was synthesized by reacting 5.4 g of $FeCl_3 \cdot 6H_2O$ and 2.4 g of $CoCl_2 \cdot 6H_2O$ with 24.36 g of oleic acid sodium salt in a mixture containing 40 mL of ethanol, 30 mL of $H_2O$ and 70 mL of hexane, was added to a solvent containing 10 g of dehydrated 1-octadecene under inert atmosphere, and the resulting mixture was heated to 320° C. and kept for 30 min at the same temperature.

During this process, the precursors were thermally decomposed completely and the bimetallic ferrite nanoparticles were formed. And then the solution was cooled to room temperature. In order to remove excess surfactants and the by-products, anhydrous and degassed ethanol was added, yielding a brownish black precipitate, where the supernatant was discarded either by decanting or by centrifugation. Thereafter, this washing process was repeated three times or more and the ethanol was removed by vacuum drying. The resulting spherical cobalt ferrite ($CoFe_2O_4$) nanoparticles of 8 nm in diameter were easily re-dispersed in hexane.

Figure 16:
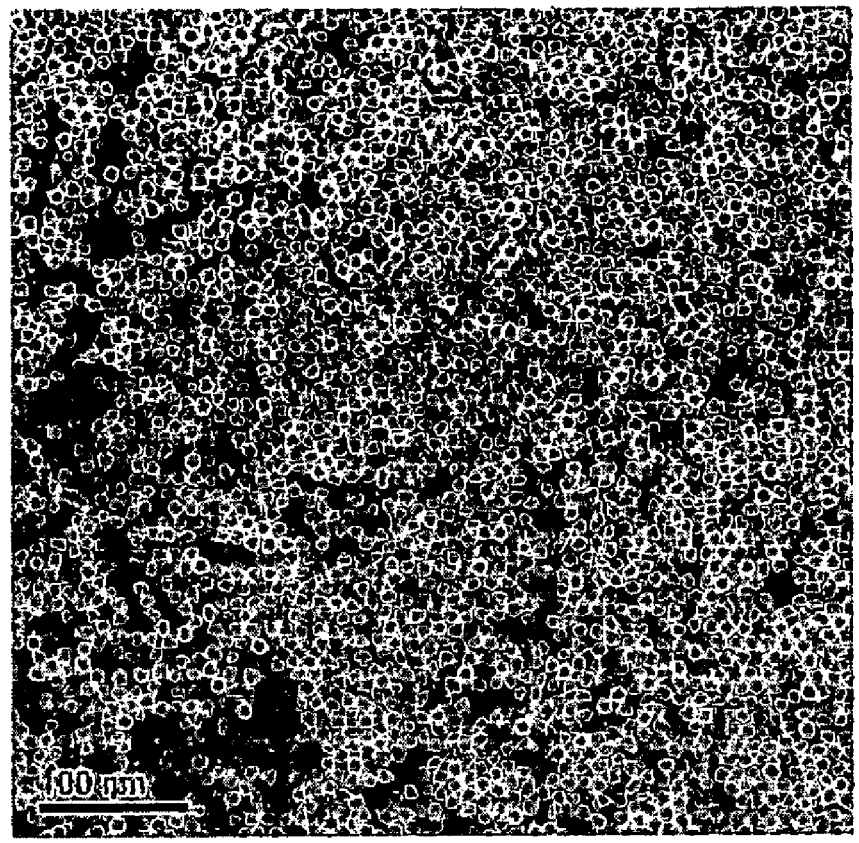
FIG. 16 is an exemplary TEM image of the spherical cobalt ferrite ($CoFe_2O_4$) nanoparticles of 8 nm in diameter synthesized according to Embodiment 10.

A TEM image of the resulting cobalt ferrite nanoparticles synthesized according to this procedure is as shown in FIG. 16, indicating that the resulting spherical cobalt ferrite ($CoFe_2O_4$) nanoparticles of 8 nm in diameter are monodisperse.

Example 11

Synthesis of Monodisperse Spherical Manganese Ferrite ($MnFe_2O_4$) Nanoparticles Monodisperse spherical manganese ferrite ($MnFe_2O_4$) nanoparticles were synthesized under the similar reaction conditions as in Example 10; 1.8 g of iron oleate and 0.62 g of manganese oleate were added to a solvent containing 10 g of dehydrated 1-octadecene under inert atmosphere and the resulting mixture was heated to 320° C. and kept for 30 min at the same temperature. Through the same washing process as in Example 9, the spherical manganese ferrite ($MnFe_2O_4$) nanoparticles of 9 nm in diameter were synthesized.

Figure 17:
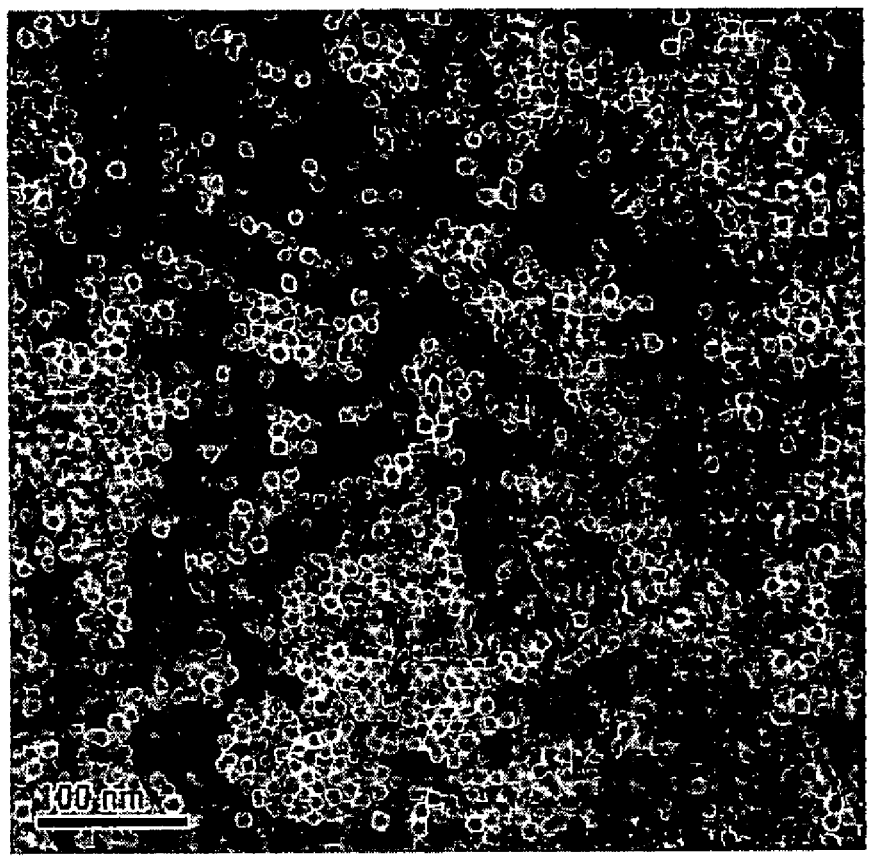
FIG. 17 is an exemplary TEM image of the spherical manganese ferrite ($MnFe_2O_4$) nanoparticles of 9 nm in diameter synthesized according to Example 11.

A TEM image of manganese ferrite ($MnFe_2O_4$) nanoparticles synthesized according to the procedure described above is shown in FIG. 17, demonstrating that the 9 nm size spherical manganese ferrite nanoparticles are monodisperse.

Example 12

Magnetic Property of Spherical Iron Oxide Nanoparticles

The temperature dependence of magnetization was measured after zero field cooling (ZFC) using 100 Oe between 5 and 380 K on the 5, 9, 12, 16 and 22 nm size spherical iron oxide nanoparticles synthesized according to Examples 2, 3, 4, 5 and 6 by using a superconducting quantum interference device (SQUID).

Figure 18:
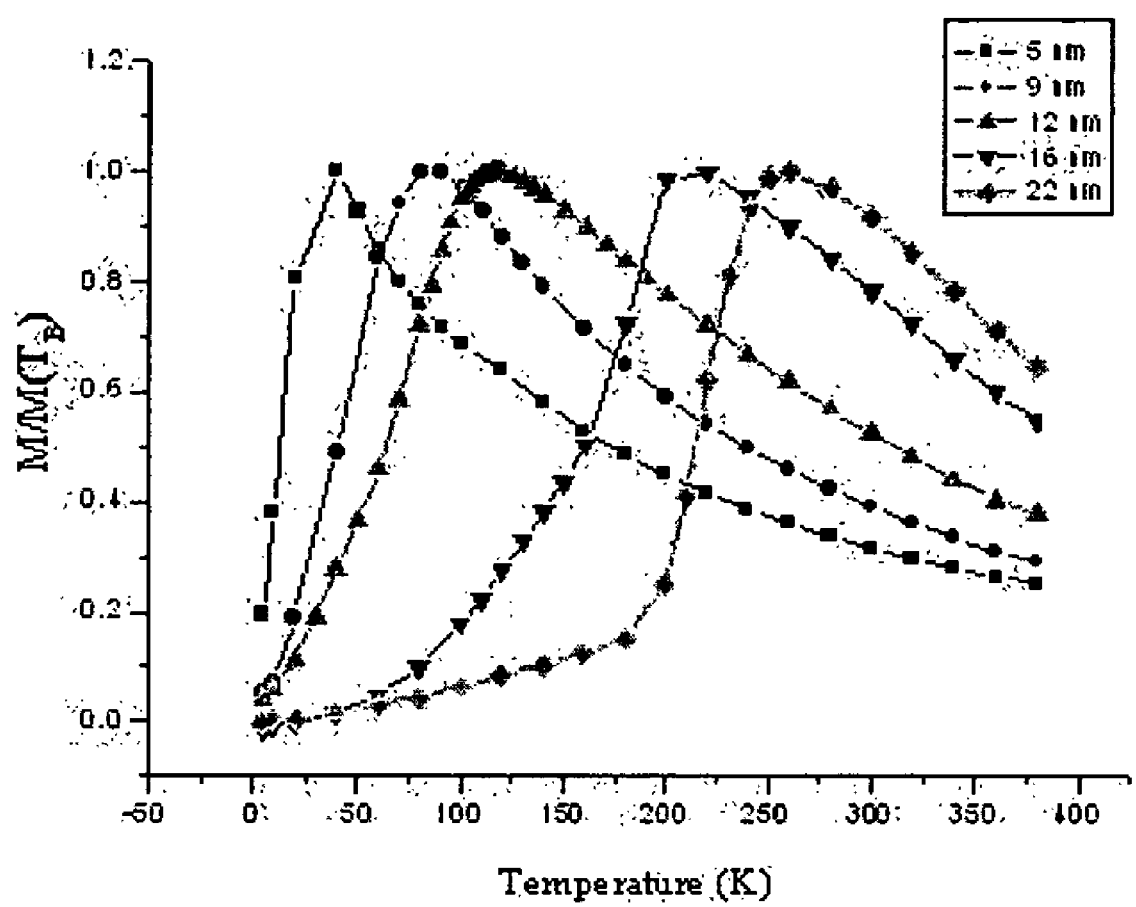
FIG. 18 is a magnetization curve of the spherical iron oxide nanoparticles of 5, 9, 12, 16 and 22 nm in diameter measured after zero-field cooling process showing a temperature dependence, where the spherical iron oxide nanoparticles in five different sizes of 5, 9, 12, 16, 22 nm in diameter are synthesized according to the Examples 3, 4, 2, 5, 6, respectively.

The graph of the resulting data of the magnetization versus temperature with ZFC is as shown in FIG. 18, which is very similar to that for 5, 9, 12, 16 and 22 nm spherical iron oxide nanoparticles. The graph in FIG. 18 reveals that the blocking temperature (TB) of the spherical iron oxide nanoparticles of 5, 9, 12, 16 and 22 nm in diameter were measured to be 30, 80, 125, 230, and 260 K, respectively. All iron oxide samples show superparamagnetic behavior above the blocking temperatures and TB increases continuously as the diameter of the nanoparticles increases.

Example 13

Synthesis of Monodisperse Spherical Zinc Oxide (ZnO) Nanoparticles

Following the synthesis procedure described in Example 1, 12 g of zinc oleate complex which was synthesized by reacting 5.45 g of $ZnCl_2$ with 24.36 g of oleic acid sodium salt in a mixture containing 40 mL of ethanol, 30 mL of $H_2O$ and 70 mL of hexane, was added to a stabilizing coordinating solvent 60 g of TOPO under an inert atmosphere and the resulting mixture was heated to 330° C. and kept for 1 h at the same temperature.

During this process, the precursors were thermally decomposed completely and zinc oxide nanoparticles were formed, and then the solution was cooled to room temperature. In order to remove excess surfactants and the by-products, anhydrous and degassed ethanol was added to form a white precipitate. The supernatant was discarded either by decanting or by centrifugation. Thereafter, this washing process was repeated three times or more and the ethanol was removed by vacuum drying. The resulting ZnO nanoparticles of 5 nm in diameter were easily re-dispersed in hexane.

Figure 19:
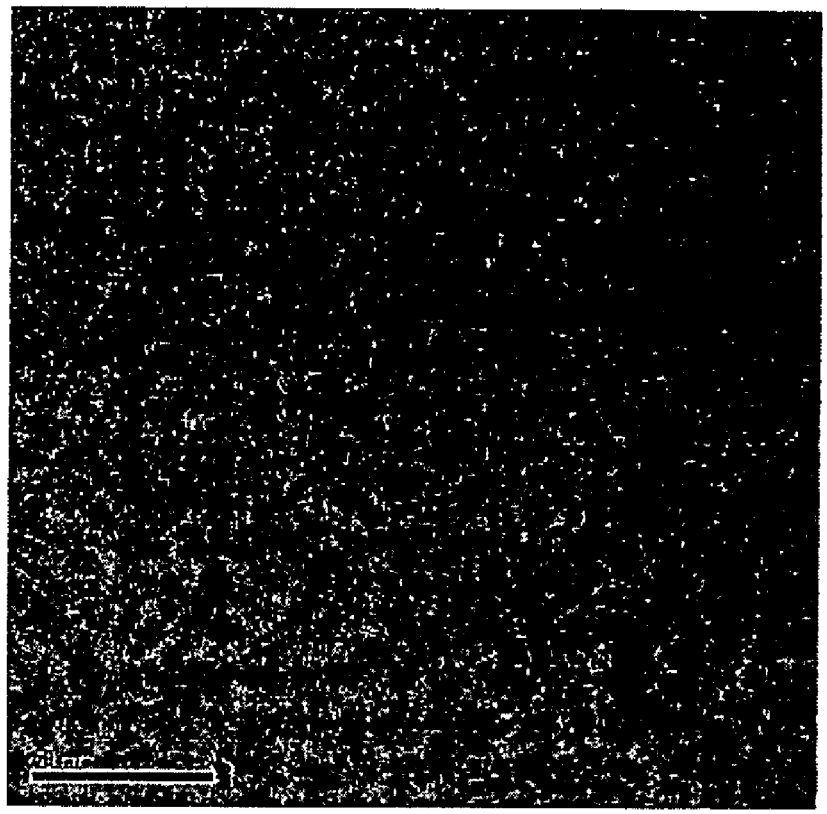
FIG. 19 is an exemplary TEM image of the spherical zinc oxide (ZnO) nanoparticles of 5 nm in diameter synthesized according to Example 13.

The TEM image of the ZnO nanoparticles synthesized according to the procedure followed in the present Example 13, is shown in FIG. 19, illustrating that the 5 nm size spherical ZnO nanoparticles are monodisperse.

Example 14

Synthesis of Monodisperse Spherical Ceria (CeO₂) Nanoparticles

Following the synthesis procedure described in Example 1, 20 g of cerium oleate complex which was synthesized by reacting 7.45 g of $CeCl_3 \cdot 7H_2O$ with 18.27 g of oleic acid sodium salt in the mixture containing 40 mL of ethanol, 30 mL of $H_2O$ and 70 mL of hexane, was added to a stabilizing coordinating solvent, 200 mL of oleylamine under an inert atmosphere and the resulting mixture was heated to 320° C. and kept for 2 hours at the same temperature.

During this process, the precursors were thermally decomposed completely and the ceria nanoparticles were formed, and then the solution was cooled to room temperature. In order to remove the excess surfactants and the by-products, anhydrous and degassed ethanol was added to form a white precipitate. The supernatant was discarded either by decanting or by centrifugation. Thereafter, this washing process was repeated three times or more and the ethanol was removed by vacuum drying. The resulting spherical ceria nanoparticles of 2 nm in diameter were easily re-dispersed in hexane.

Figure 20:
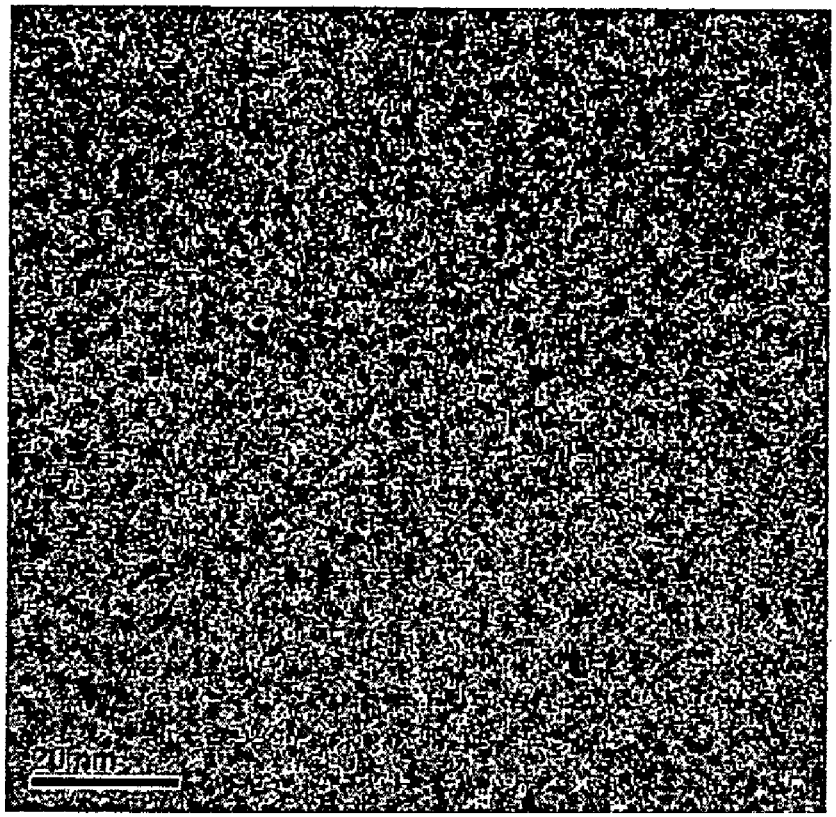
FIG. 20 is an exemplary TEM image of the spherical ceria (cerium oxide —$CeO_2$) nanoparticles of 2 nm in diameter synthesized according to Example 14.

The TEM image of the resulting ceria nanoparticles synthesized according to the procedure employed in the present Example 14, is shown in FIG. 20, illustrating that the resulting 2 nm size spherical ceria nanoparticles are monodisperse.

INDUSTRIAL APPLICABILITY

Recently, the development of the monodisperse and highly crystalline nanoparticles of metals, alloys, metal oxides and multi-metallic oxides have been actively carried out for not only their fundamental scientific interests, but also many potential technological and practical applications in the areas such as ultra-high density magnetic data storage media, biomedical labeling reagents, drug delivery materials, nanoscale electronics, highly efficient laser beam sources, highly bright optical devices, and MRI enhancing agents, for which the conventional synthesis methods have not been well suitable for large scale and inexpensive production of such nanoparticles for industrial applications.

The synthesis methods disclosed in the present invention have advantages of providing simple, inexpensive, nontoxic and environment-friendly, and very unique ways of synthesizing the desired nanoparticles of monodisperse and highly crystalline in large quantity. Therefore, the synthesis methods presented here are beneficial for potential applications in the areas of ultra-high density magnetic data storage media, biomedical labeling reagents, drug targeting materials, nanoscale electronics, highly efficient laser beam sources, highly bright optical devices, and MRI enhancing agents.

What is claimed is:

1. A process for making nanoparticles of metals, metal oxides and multi-metallic oxides, which comprises the steps of:
   i) reacting a metal salt dissolved in water with an alkali metal salt of $C_{4-25}$ carboxylic acid dissolved in a first solvent selected from the group consisting of $C_{5-10}$ aliphatic hydrocarbon and $C_{6-10}$ aromatic hydrocarbon to form a metal carboxylate complex;
   ii) separating said metal carboxylate complex from an upper organic layer containing said metal carboxylate complex by removing said first solvent; and
   iii) heating said metal carboxylate complex dissolved in a second solvent selected from the group consisting of $C_{6-25}$ aromatic, $C_{6-25}$ ether, $C_{6-25}$ aliphatic hydrocarbon and $C_{6-25}$ amine at a rate of 1° C./min to 200° C./min from room temperature to the boiling temperature of said second solvent to cause an abrupt thermal decomposition of said metal carboxylate complex and instantaneous nucleation of monodisperse nanoparticles, to produce the monodisperse nanoparticles.

2. The process of claim 1, wherein said metal is selected from the group consisting of Fe, Co, Ti, V, Cr, Mn, Ni, Cu, Zn, Y, Zr, Mo, Ru, Rh, Pd, Ag, Cd, Ce, Pt, Au, Ba, Sr, Pb, Hg, Al, Ga, In, Sn and Ge, and said alkali metal is selected from the group consisting of Li, Na and K.

3. The process of claim 1, wherein said metal salt is selected from the group consisting of iron(III) chloride [$FeCl_3$], iron(II) chloride [$FeCl_2$], iron(II) bromide [$FeBr_2$], iron(II) sulfate [$FeSO_4$], iron(III) nitrate [$Fe(NO_3)_3$], iron(II) stearate [$Fe(O_2C_{18}H_{35})_2$], iron(II) acetate [$FeOOCCH_3]_2$, cobalt(III) chloride [$CoCl_3$], cobalt(II) chloride [$CoCl_2$], cobalt(III) nitrate [$Co(NO_3)_3$], nickel(II) sulfate [$NiSO_4$], nickel(II) chloride [$NiCl_2$], nickel(II) nitrate [$Ni(NO_3)_2$], titanium tetrachloride [$TiCl_4$], zirconium tetrachloride [$ZrCl_4$], hydrogen hexachloroplatinate(IV) [$H_2PtCl_6$], hydrogen hexachloropalladiate(IV) [$H_2PdCl_6$], barium chloride [$BaCl_2$], barium sulfate [$BaSO_4$], strontium chloride [$SrCl_2$], strontium sulfate [$SrSO_4$], zinc acetate [$Zn(OOCH_3)_2$], manganese acetate [$Mn(OOCH_3)_2$], cerium (III) acetate hydrate [$(CH_3COO)_3Ce \cdot xH_2O$], cerium(III) bromide hydrate [$CeBr_3 \cdot xH_2O$], cerium(III) chloride heptahydrate [$CeCl_3 \cdot 7H_2O$], cerium(III) carbonate hydrate [$Ce_2(CO_3)_3 \cdot xH_2O$], cerium(III) fluoride hydrate [$CeF_3 \cdot xH_2O$], cerium(III) 2-ethylhexanoate [$CH_3(CH_2)_3CH(C_2H_5)CO_2]_3$ Ce, cerium(III) iodide [$CeI_3$], cerium(III) nitrate hexahydrate [$Ce(NO_3)_3 \cdot 6H_2O$], cerium(III) oxalate hydrate [$Ce_2(C_2O_4)_3 \cdot xH_2O$], cerium(III) perchlorate [$Ce(ClO_4)_3$], cerium(III) sulfate hydrate [$Ce_2(SO_4)_3 \cdot xH_2O$], iron acetylacetonate [$Fe(acac)_3$], cobalt acetylacetonate [$Co(acac)_3$], nickel acetylacetonate [Ni(acac)$_2$], copper acetylacetonate [Cu(acac)$_2$], barium acetylacetonate [Ba(acac)$_2$], strontium acetylacetonate[Sr(acac)$_2$], cerium(III) acetylacetonate hydrate [(acac)$_3$ Ce.XH$_2$O], platinum acetylacetonate [Pt(acac)$_2$], palladium acetylacetonate [Pd(acac)$_2$], titanium tetraisopropoxide [Ti($^i$OC$_3$H$_7$)$_4$] and zirconium tetrabutoxide [Zr(OC$_4$H$_9$)$_4$].

4. The process of claim 1, wherein said metal salt is selected from the group consisting of hydrated iron(III) chloride [FeCl$_3$.6H$_2$O], hydrated iron(II) chloride [FeCl$_2$.4H$_2$O], hydrated cobalt(III) chloride [CoCl$_3$.6H$_2$O], hydrated cobalt (II) chloride [CoCl$_2$.4H$_2$O], hydrated chromium(III) chloride [CrCl$_3$.6H$_2$O] and hydrated manganese(II) chloride [MnCl$_2$.4H$_2$O].

5. The process of claim 1, wherein said alkali metal salt of C$_{4-25}$ carboxylic acid is selected from the group consisting of sodium oleate, sodium stearate, sodium laurate, potassium oleate, potassium stearate, potassium laurate, sodium dodecylsulfate (SDS) and sodium dodecylbenzyl sulfonate (DBS).

6. The process of claim 1, wherein said first solvent is selected from the group consisting of hexane heptane, pentane, octane, hexadecane, octadecane, xylene, toluene and benzene.

7. The process of claim 1, wherein said second solvent is selected from the group consisting of octadecane, eicosane, hexadecane, eicosene, phenanthrene, pentacene, anthracene, biphenyl, dimethyl biphenyl, phenyl ether, octyl ether, decyl ether, benzyl ether, trioctylamine, hexadecylamine and octadecylamine.

8. The process of claim 1, wherein a C$_{4-25}$ carboxylic acid is added to said metal carboxylate complex dissolved in the second solvent before the start of the step ii).

9. The process of claim 8, wherein said C$_{4-25}$ carboxylic acid is selected from the group consisting of oleic acid, stearic acid, lauric acid, palmitic acid, octanoic acid and decanoic acid.

10. The process of claim 1, wherein ethanol and/or methanol is added to said metal salt dissolved in water.

11. The process of claim 1, wherein said metal carboxylate complex solution in step ii) is heated to a temperature between 200° C. and the boiling temperature of said second solvent.

12. The process of claim 11, wherein said temperature is maintained for 1 minute to 24 hours.

* * * * *